(12) United States Patent
Toujo

(10) Patent No.: US 8,860,631 B2
(45) Date of Patent: Oct. 14, 2014

(54) METAMATERIAL

(75) Inventor: Atsushi Toujo, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 378 days.

(21) Appl. No.: 13/037,778

(22) Filed: Mar. 1, 2011

(65) Prior Publication Data
US 2011/0175795 A1 Jul. 21, 2011

Related U.S. Application Data

(63) Continuation of application No. PCT/JP2009/064907, filed on Aug. 27, 2009.

(30) Foreign Application Priority Data

Sep. 3, 2008 (JP) .................................. 2008-225897
Mar. 2, 2009 (JP) .................................. 2009-048150

(51) Int. Cl.
| | | |
|---|---|---|
| H01Q 15/02 | (2006.01) | |
| H01Q 15/24 | (2006.01) | |
| H01P 3/08 | (2006.01) | |
| H01P 7/08 | (2006.01) | |
| H01P 7/00 | (2006.01) | |
| G02B 1/00 | (2006.01) | |

(52) U.S. Cl.
CPC .. *H01P 7/00* (2013.01); *H01P 3/08* (2013.01); *H01P 7/084* (2013.01); *G02B 1/007* (2013.01); *G02B 1/002* (2013.01)
USPC .......................................................... 343/909

(58) Field of Classification Search
CPC .......... H01Q 15/0006; H01Q 15/0013; H01Q 15/002; H01Q 15/006; H01Q 15/008; H01Q 15/0026; H01Q 15/0046; H01Q 15/0066; H01Q 15/0086; H01Q 3/44; H01Q 3/446
See application file for complete search history.

(56) References Cited

U.S. PATENT DOCUMENTS

| | | | | |
|---|---|---|---|---|
| 6,608,811 | B1 * | 8/2003 | Holden et al. ................ | 361/303 |
| 6,670,921 | B2 * | 12/2003 | Sievenpiper et al. .. | 343/700 MS |
| 7,123,118 | B2 * | 10/2006 | McKinzie, III ............... | 333/219 |
| 7,538,946 | B2 | 5/2009 | Smith | |
| 8,130,171 | B2 * | 3/2012 | Lam et al. ..................... | 343/909 |
| 2008/0105826 | A1 * | 5/2008 | Mercure et al. ............... | 250/394 |

FOREIGN PATENT DOCUMENTS

| | | |
|---|---|---|
| JP | 2007-306563 | 11/2007 |
| JP | 2008-507733 T | 3/2008 |
| WO | WO 2009/128193 | 10/2009 |

OTHER PUBLICATIONS

Pendry et al. "Low Frequency Plasmons in thin wire structures" J. Phys. Condens. Matter vol. 10 (1998) pp. 4785-4809.

(Continued)

*Primary Examiner* — Hoang V Nguyen
*Assistant Examiner* — Patrick Holecek
(74) *Attorney, Agent, or Firm* — Dickstein Shapiro LLP

(57) ABSTRACT

A metamaterial includes a plurality of first coiled resonators and a plurality of second coiled resonators, and an outer covering for fixing the positions of the first coiled resonators and the second coiled resonators. Each of the first coiled resonators and each of the second coiled resonators are disposed such that the central axes thereof differ from each other by 90 degrees. At the same time, adjacent first coiled resonators and second coiled resonators are disposed so as to be alternately linked in the shape of a chain. The first coiled resonators are disposed in a spatially continuous manner.

19 Claims, 20 Drawing Sheets

(56) References Cited

OTHER PUBLICATIONS

Tojo et al. " Possibility of Synthesizing Matamaterial with Chip Coil" 2008 IEICE Electronics Society, Collection of Papers for Lectures 1, Sep. 2, 2008, p. 58, C-22-33.

"Left-handed Metamaterial", Nikkei Electronics Jan. 2, Nikkei Business Publications. Inc. Jan. 2, 2006, pp. 75-81.

Burokur et al. "Influence of split ring resonators on the properties of propagating structures" IET Microwaves, Antennas & Proagation, 2007.02, vol. 1 pp. 94-99.

PCT/JP2009/064907 Written Opinion dated Nov. 24, 2009.

* cited by examiner

METAMATERIAL

CROSS REFERENCE TO RELATED APPLICATIONS

The present application is a continuation of International Application No. PCT/JP2009/064907, filed Aug. 27, 2009, which claims priority to Japanese Patent Application No. JP2008-225897, filed Sep. 3, 2008, and Japanese Patent Application No. JP2009-048150, filed Mar. 2, 2009, the entire contents of each of these applications being incorporated herein by reference in their entirety.

FIELD OF THE INVENTION

The present invention relates to a metamaterial, and more particularly, relates to a left-handed metamaterial with a negative dielectric constant and a negative magnetic permeability.

BACKGROUND OF THE INVENTION

In recent years, devices referred to as metamaterials have been attracting attention. This metamaterial refers to an artificial substance which has electromagnetic and/or optical properties provided by none of substances in nature. Typical properties of this metamaterial include a negative magnetic permeability ($\mu<0$), a negative dielectric constant ($\in<0$), or a negative refractive index (when the magnetic permeability and the dielectric constant are both negative). It is to be noted that the region with $\mu<0$ and $\in>0$ or the region with $\mu>0$ and $\in<0$ is also referred tows a "evanescent solution region", whereas the region with $\mu<0$ and $\in<0$ is also referred to as a "left-handed region".

Left-handed metamaterials with $\mu<0$ and $\in<0$ are made by a periodic arrangement of an element with a negative dielectric constant and an element with a negative magnetic permeability, in order to develop a negative dielectric constant and a negative magnetic permeability at the same time.

Left-handed metamaterials are classified roughly into a circuit system and a resonance system. As a means for developing negative magnetic permeability $\mu$ in the resonance system, for example, a split ring resonator (SRR) has been known (for example, see Non-Patent Document 1).

On the other hand, as a means for developing negative dielectric constant $\in$, a metallic wire has been known which is sufficiently long with respect to the wavelength of an electromagnetic wave. This metallic wire decreases a plasma frequency to develop negative dielectric constant $\in$. Non-Patent Document 2 discloses the ability of an array of metallic wires to develop negative dielectric constant $\in$. In addition, Japanese Patent Application Laid-Open No. 2008-507733 (Patent Document 1) discloses a wire of a periodic lattice for a negative dielectric constant.

In addition, it has been also known that a metallic wire which has a length of half the wavelength $\lambda$ of an electromagnetic wave generates a negative dielectric constant through a resonance with the electromagnetic wave. Further, it has been known that a waveguide exhibits a negative dielectric constant in a frequency band not more than a cutoff frequency.

Patent Document 1: Japanese Patent Application Laid-Open No. 2008-507733

Non-Patent document 1: "Left-handed Metamaterial", Nikkei Electronics January 2, Nikkei Business Publications, Inc., Jan. 2, 2006, PP. 75-81

Non-Patent document 2: J B Pendry et al., "Low Frequency Plasmons in thin-wire structures", J. Phys. Condens. Matter Vol. 10 (1998) 4785-4809

SUMMARY OF THE INVENTION

In terms of practical utility, the achievement of small-size metamaterials is desired. However, a conventional left-handed metamaterial has a significantly large size, which is composed of a combination of a split ring resonator and a metallic wire.

The present invention has been achieved to solve the above problem, and an object of the present invention is to provide a left-handed metamaterial which can be reduced in size.

A metamaterial in accordance with an aspect of the present invention includes a plurality of first resonators each for generating a negative dielectric constant with respect to a predetermined wavelength. Each of the first resonators includes an internal space. The metamaterial further includes a plurality of second resonators each for generating a negative magnetic permeability with respect to the predetermined wavelength, and a supporting member for fixing the positions of the first resonators and second resonators. The supporting member fixes each of the second resonators inside the plurality of first resonators, and fixes the plurality of first resonators so that the plurality of first resonators are located in a spatially continuous manner.

Preferably, each of the first resonators includes a metallic wire having a length of substantially half the predetermined wavelength.

More preferably, the metallic wire includes a first coil having a length of substantially half the predetermined wavelength with a first axis as a central axis. Each of the second resonators includes a second coil having a length of substantially half the predetermined wavelength with a second axis orthogonal to the first axis as a center. The supporting member fixes the first coil and the second coil so that the first coil and the second coil are disposed so as to be alternately linked in the shape of a chain.

More preferably, the metallic wire includes a first coil having a length of substantially half the predetermined wavelength with a first axis as a central axis. The supporting member fixes each of the second resonators in a region surrounded by the corresponding first coil.

More preferably, each of the second resonators includes a second coil having a length of substantially half the predetermined wavelength with a second axis orthogonal to the first axis as a central axis.

More preferably, each of the first resonators further includes a conductive plate connected to an end of the first coil.

More preferably, the second resonators are multilayer capacitive resonators.

More preferably, the second resonators are split ring resonators.

More preferably, each of the first resonators further includes a first plate electrode connected to a first end of the metallic wire and a second plate electrode connected to a second end of the metallic wire, the second end on the side opposite to the first end. The supporting member fixes each of the second resonators in a region sandwiched between the first plate electrode and the second plate electrode.

More preferably, the metallic wire is bent.

More preferably, each of the second resonators includes a first electrode plane, a second electrode plane opposed to the first electrode plane, and a conductive section for electrically connecting the first electrode plane and the second electrode plane.

More preferably, the second resonators are multilayer capacitive resonators.

More preferably, the second resonators are split ring resonators.

More preferably, the supporting member includes an insulating material. The first electrode plane and the second electrode plane are placed in the insulating material. The conductive section electrically connects the first electrode plane and the second electrode plane through a via formed in the insulating material.

More preferably, the supporting member, the first resonators, the second resonators are formed from multiple substrate layers.

A metamaterial in accordance with another aspect of the present invention includes a first resonator for generating a negative dielectric constant with respect to a predetermined wavelength. The first resonator includes an internal space. The metamaterial further includes a second resonator for generating a negative magnetic permeability with respect to the predetermined wavelength, and a supporting member for fixing the positions of the first resonator and second resonator. The supporting member fixes the second resonator inside the first resonator.

A metamaterial in accordance with yet another aspect of the present invention includes a plurality of first resonators each for generating a negative dielectric constant with respect to a predetermined wavelength, and a plurality of second resonators each for generating a negative magnetic permeability with respect to the predetermined wavelength. Each of the second resonators includes an internal space. The metamaterial further includes a supporting member for fixing the positions of the first resonators and second resonators. The supporting member fixes each of the first resonators inside the plurality of second resonators, and fixes the plurality of second resonators so that the plurality of second resonators are located in a spatially continuous manner.

Preferably, each of the first resonators includes a metallic wire which has a length of substantially half the predetermined wavelength.

More preferably, the metallic wire is bent.

More preferably, each of the second resonators includes a first electrode plane, a second electrode plane, and a conductive section for electrically connecting the first electrode plane and the second electrode plane.

More preferably, the second resonators are multilayer capacitive resonators.

More preferably, the second resonators are split ring resonators.

More preferably, the supporting member includes an insulating material. The first electrode plane and the second electrode plane are placed in the insulating material. The conductive section electrically connects the first electrode plane and the second electrode plane through a via formed in the insulating material.

More preferably, the supporting member, the first resonators, the second resonators are formed from multiple substrate layers.

A metamaterial in accordance with yet another aspect of the present invention includes a first resonator for generating a negative dielectric constant with respect to a predetermined wavelength, and a second resonator for generating a negative magnetic permeability with respect to the predetermined wavelength. The second resonator includes an internal space. The metamaterial further includes a supporting member for fixing the positions of the first resonator and second resonator. The supporting member fixes the first resonator inside the second resonator.

According to the present invention, the plurality of first resonators including an internal space for generating a negative dielectric constant (or magnetic permeability) is combined with the plurality of second resonators for generating a negative magnetic permeability (or dielectric constant). In this case, the second resonators are located inside the first resonators. Accordingly, according to the present invention, a left-handed metamaterial can be provided which can be reduced in size.

In addition, according to an aspect of the present invention, the plurality of first resonators each including an internal space for generating a negative dielectric constant (or magnetic permeability) is combined with the plurality of second resonators each for generating a negative magnetic permeability (or dielectric constant). In this case, each of the second resonators is located inside the plurality of first resonators and so that the plurality of first resonators are located in a spatially continuous manner. Accordingly, according to the present invention, a left-handed metamaterial can be provided which can be reduced in size.

DETAILED DESCRIPTION OF THE INVENTION

Resonator

A left-handed metamaterial according to the present embodiment is directed to a resonance system of resonators combined. Thus, resonators will be described which constitute the left-handed metamaterial according to the present embodiment. However, the resonators according to the present embodiment are not to be considered limited to resonators described herein. As will be described in some embodiments below, it is also possible to use well known resonators, for example, split ring resonators as the resonator for developing a negative magnetic permeability.

Multilayer Capacitive Resonator)

One of resonators for use in the present embodiment is a multilayer capacitive resonator including a plurality of electrodes. This resonator has a resonant circuit formed mainly with a capacitance produced between the electrodes. This resonant circuit is sensitive to a specific frequency component of electromagnetic waves generated by an alternate current flowing through signal lines around the resonator, and can give rise to an electrical resonance phenomenon in response to electromagnetic waves of this frequency component. This resonance phenomenon develops a negative magnetic permeability.

In this case, in order to give rise to a magnetic permeability resonance which is a function as a metamaterial, the length of each resonator in the direction of electric current propagation needs to be at least $\lambda/4$ shorter than the wavelength $\lambda$ of the electromagnetic wave at a target frequency. Furthermore, the length of each resonator in the direction of electric current propagation is preferably $\lambda/20$ or less.

As the resonator, laminated capacitors, etc. can be used which are formed by stacking a plurality of plate electrodes with an insulator (dielectric) therebetween. The configuration of a resonator achieved with the use of a laminated capacitor will be given below as an example. In accordance with this configuration, commercial laminated capacitors such as laminated ceramic capacitors can be used to constitute resonators easily. However, electrode members may be used which are designed exclusively for constituting resonators according to the present embodiment.

Figure 1:
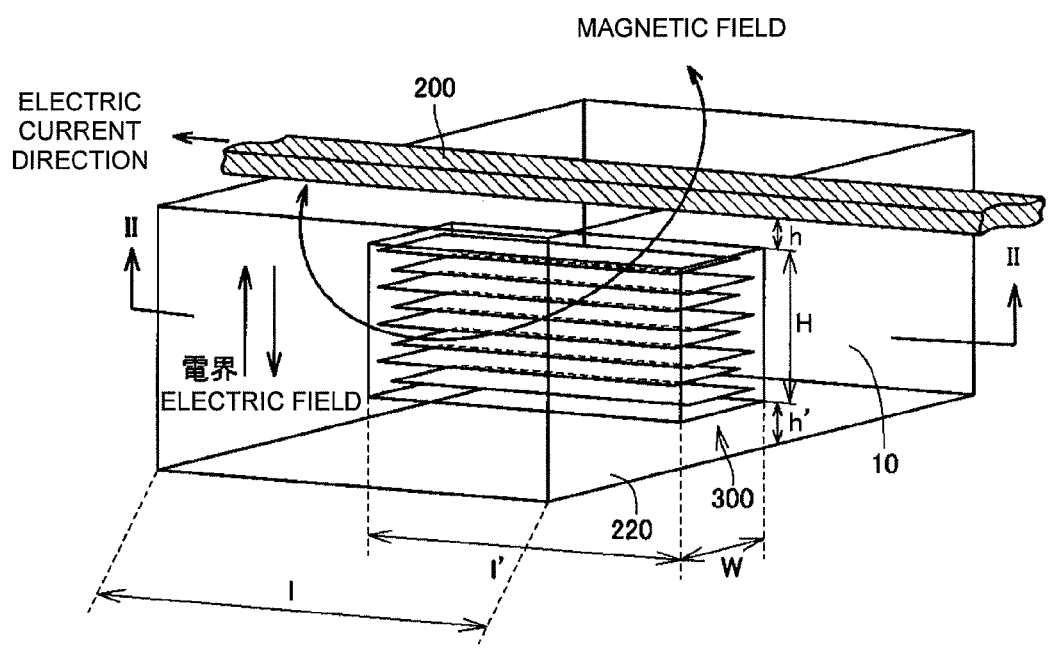
FIG. 1 is a schematic external view of a capacitive resonator.

FIG. 1 is a schematic external view of a capacitive resonator 300. Referring to FIG. 1, the capacitive resonator 300 is covered with an outer covering 10 which is a nonmagnetic body. It is to be noted that resin materials such as Teflon (registered trademark) are suitable as the outer covering 10. This capacitive resonator 300 is placed close to a signal line 200 through which an electric current including a predetermined frequency component flows, to give rise to a resonance in response to a specific frequency component (resonance frequency) of electromagnetic waves generated by the electric current. In addition, a ground 220 is set on the side opposite to the side in contact with the signal line 200 of the capacitive resonator 300.

The resonance in the capacitive resonator 300 generates a magnetic flux in the capacitive resonator 300 to develop a negative magnetic permeability.

Further, in order for the capacitive resonator 300 to develop a negative magnetic permeability, that is, produce a negative magnetic permeability which is a function as a metamaterial, the length l' of the capacitive resonator 300 along the direction of electric current propagation in the signal line 200 needs to be at least shorter than $\lambda/4$ with respect to the wavelength $\lambda$ of the electromagnetic wave at a resonance frequency. Furthermore, the length l of the capacitive resonator 300 is preferably $\lambda/20$ or less.

As an example of the capacitive resonator 300, a case will be given below using a laminated capacitor including 8 layers of internal electrodes with a length l'=1.6 mm, a width W=0.8 mm, and a height H=0.8 mm. It is to be noted that the distance between the signal line 200 and the laminated capacitor is h=0.2 mm and the distance between the laminated capacitor and the ground 220 is h'=0.2 mm.

In this case, the condition of $\lambda/4$=length l'=1.6 mm results in $\lambda$=6.4 mm, which corresponds to a frequency fmax=46.875 GHz in air. Accordingly, when this capacitive resonator 300 is arranged at a pitch of $\lambda/4$ or less, the arrangement can be used as a metamaterial in the gigahertz band. It will be understood that the length l of the resonator can be appropriately designed depending on the frequency range to be applied.

Figure 2:
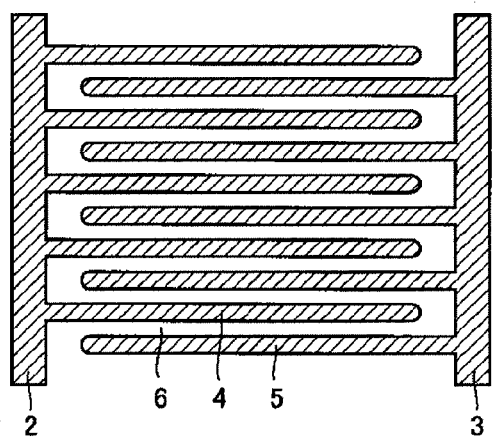
FIG. 2 is a cross-sectional view of FIG. 1 along line II-II.

Next, the structure of the capacitive resonator 300 will be described with reference to FIGS. 1 and 2. FIG. 2 is a cross-sectional view of FIG. 1 along the line II-II.

Referring to FIG. 1, when an electric current flows through the signal line 200, an alternate-current magnetic field is generated in a circumferential direction with the signal line 200 as a center. More specifically, the line of magnetic force for the magnetic field is made in a concentric fashion with the signal line 200 as a center. In addition, the signal line 200 has an electric potential generated when the electric current flows, and an alternate-current electric field is thus generated between the signal line 200 and the ground 220.

Referring to FIG. 2, the capacitive resonator 300 includes multiple pairs of first internal electrodes 4 and second internal electrodes 5 with spacers 6 interposed therebetween which are insulators with a high dielectric constant. The multiple first internal electrodes 4 are electrically connected to a first external electrode 2, whereas the multiple second internal electrodes 5 are electrically connected to a second external electrode 3. As described above, the capacitive resonator 300 has the multiple plate-like internal electrodes 4 and 5 stacked, and a capacitance is generated between the adjacent first internal electrode 4 and second internal electrode 5, with the capacitance value determined by the areas of the electrodes, the distance between the electrodes, the relative dielectric constant of the spacer 6, etc.

The respective electrode planes of the first internal electrodes 4 and second internal electrodes 5 constituting the capacitive resonator 300 are arranged so as to be substantially parallel to the line of magnetic force for the magnetic field. Moreover, the respective electrode planes of the first external electrode 2 and second external electrode 3 are arranged so as to be substantially parallel to the line of magnetic force for the magnetic field in planes different from the respective electrode planes of the first external electrode 2 and second external electrode 3. More specifically, as shown in FIG. 2, when the line of magnetic force for the magnetic field generated by the electric current flowing through the signal line 200 is generated in a direction perpendicular to the plane of paper, the capacitive resonator 300 is placed so that the longitudinal direction of the electrode cross section is coincident with a horizontal direction parallel to the plane of paper for the first internal electrodes 4 and second internal electrodes 5 and the longitudinal direction of the electrode cross section is coincident with a vertical direction parallel to the plane of paper for the first external electrode 2 and second external electrode 3.

Figure 3:
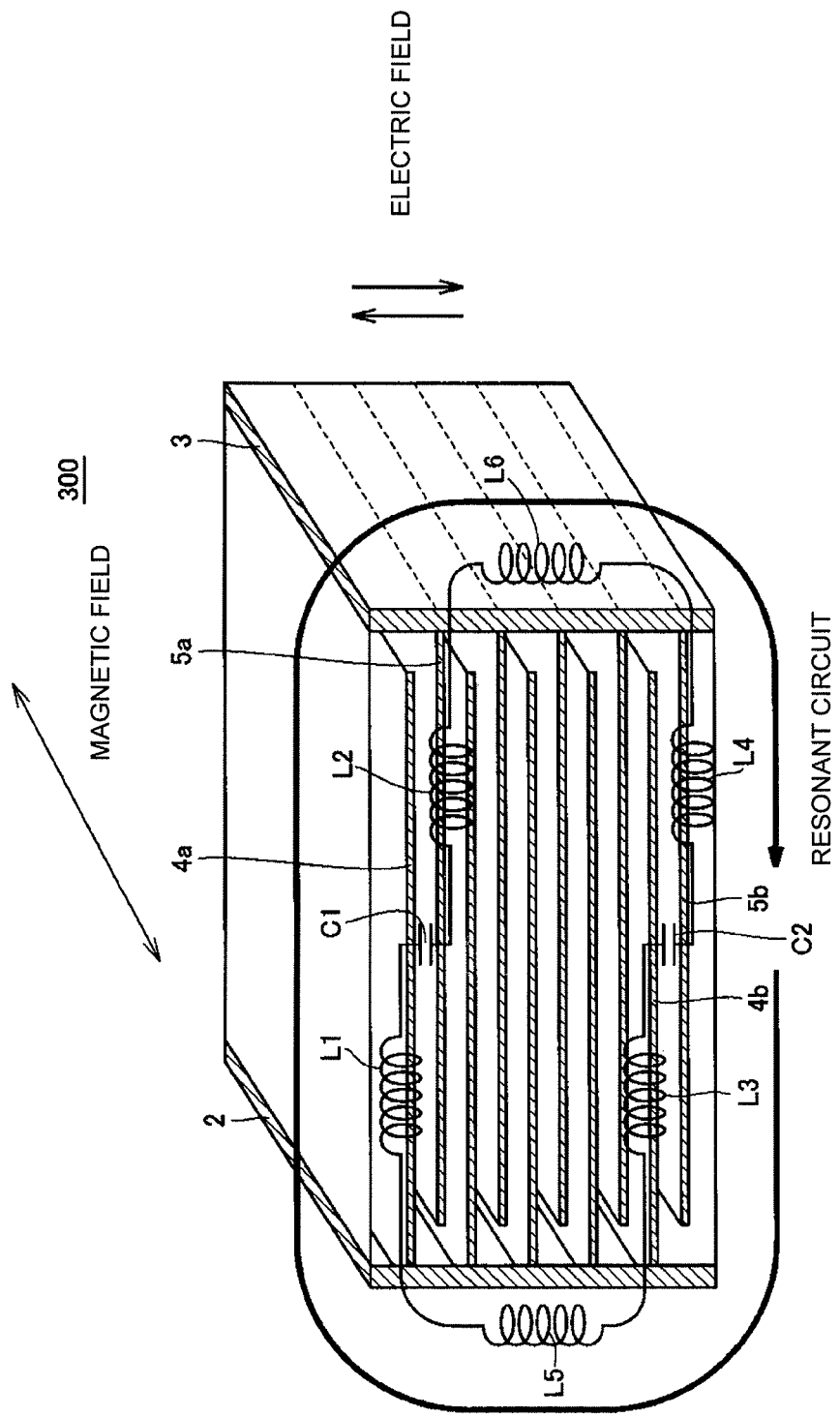
FIG. 3 is a diagram for explaining a resonant circuit formed in a capacitive resonator at a resonant frequency.

When the capacitive resonator 300 is placed to have a positional relationship as shown in FIG. 2, a resonant circuit as shown in FIG. 3 is formed with respect to a predetermined frequency component, and this resonant circuit develops a negative magnetic permeability.

FIG. 3 is a diagram for explaining a resonant circuit formed in the capacitive resonator 300 at a resonant frequency.

Referring to FIG. 3, the first internal electrodes 4 and second internal electrodes 5 as well as the first external electrode 2 and second external electrode 3, which are arranged so that the electrode planes thereof are substantially parallel to the line of magnetic force for the magnetic field, act as coils (inductors) depending on the path length of the electrodes.

In the capacitive resonator 300, the uppermost-layer electrode 4a among the first internal electrodes, the first external electrode 2, and the lowermost-layer electrode 4b among the first internal electrodes are electrically connected to each other, to form a current pathway including the uppermost-layer electrode 4a, the first external electrode 2, and the lowermost-layer electrode 4b. Likewise, the uppermost-layer electrode 5a among the second internal electrodes, the second external electrode 3, and the lowermost-layer electrode 5b among the second internal electrodes are also electrically connected to each other, to form a current pathway including the uppermost-layer electrode 5a, the second external electrode 3, and the lowermost-layer electrode 5b. In this case, the both current pathways are electrically connected to each other through a capacitance (C1) between the electrode 4a and the electrode 5a and a capacitance (C2) between the electrode 4b and the electrode 5b. As a result, a resonant circuit is formed which includes the capacitances C1 and C2 and inductances L1 to L6 generated by the respective electrodes. Therefore, the capacitive resonator 300 according to the present embodiment has a resonant frequency determined by the capacitance (C1+C2) and the inductance (L1+L2+L3+L4+L5+L6), and electromagnetic waves incident at this resonant frequency develop a resonance in terms of magnetic permeability.

It is to be noted that while a capacitance is generated respectively between the adjacent internal electrodes in the capacitive resonator 300, the other capacitances excluding the highest capacitance and the lowest capacitance have a small effect on the formation of this resonant circuit. This is because the electric current is concentrated on the outermost layer of the circulation pathway for giving rise to a resonance.

Figure 4:
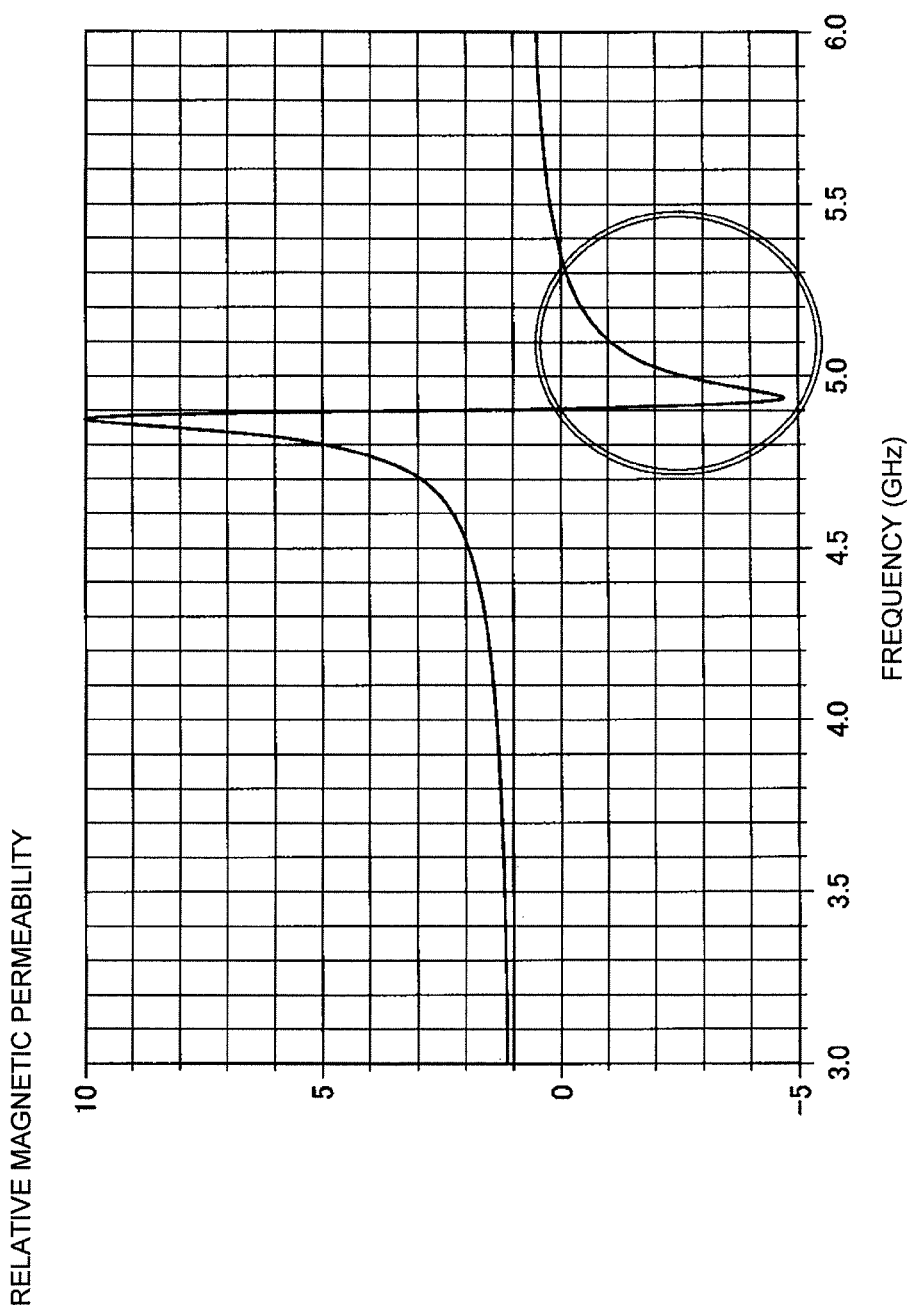
FIG. 4 is a diagram showing an example of frequency-relative magnetic permeability characteristics developed in a capacitive resonator.

FIG. 4 is a diagram showing an example of frequency-relative magnetic permeability characteristics developed in the capacitive resonator 300. It is to be noted that the change characteristics shown in FIG. 4 were calculated from simulation. The relative magnetic permeability in this case refers to the ratio of a magnetic permeability to a vacuum magnetic permeability.

Referring to FIG. 4, it is determined that the capacitive resonator 300 has a resonant frequency of about 4.9 GHz as one of its resonant frequency, and the relative magnetic permeability thus varies significantly around 4.9 GHz to develop a negative magnetic permeability.

The description above has demonstrated that the respective electrode planes of the first internal electrodes 4 and second internal electrodes 5 as well as of the first external electrode 2 and second external electrode 3, which are arranged substantially parallel to the line of magnetic force for the magnetic field, allow for the development of a negative magnetic permeability which is a function as a metamaterial. The term "substantially parallel" herein means the exclusion of the respective electrode planes orthogonal to the line of magnetic force for the magnetic field, and includes not only the respective electrode planes perfectly parallel to the line of magnetic force for the magnetic field, but also the respective electrode planes at a predetermined angle to the line of magnetic force. In practice, as long as the magnitude of a negative magnetic permeability developed in the capacitive resonator 300 has a value which can satisfy the demands of subject applications, etc, the state can be regarded as "substantially parallel".

(2. Coiled Resonator)

Next, the coiled resonator will be described. The capacitive resonator described above develops a negative magnetic permeability, whereas the coiled resonator described below develops a negative dielectric constant when the central axis is placed so as to be parallel to a direction of electric field (perpendicular to the magnetic field). In addition, the coiled resonator develops a negative magnetic permeability when the central axis is placed so as to be perpendicular to a direction of electric field (parallel to the magnetic field).

Figure 5:
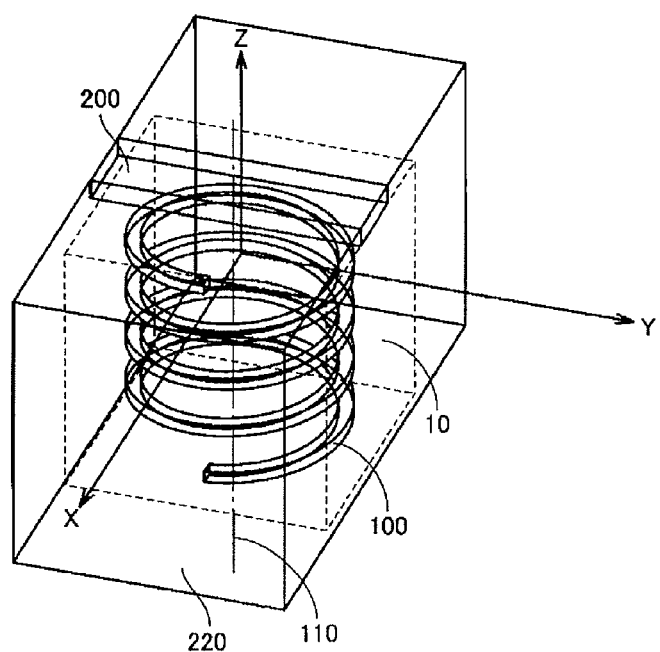
FIG. 5 is a diagram for explaining the configuration of a metamaterial for developing a negative dielectric constant with the use of a coiled resonator.

First, the structure of a metamaterial which develops a negative dielectric constant with the use of a coiled resonator will be described with reference to FIG. 5. FIG. 5 is a diagram for explaining the structure of a metamaterial which develops a negative dielectric constant with the use of a coiled resonator.

The metamaterial shown in FIG. 5 includes a coiled resonator 100 and an outer covering 10. The coiled resonator 100 is covered with the outer covering 10 which is a nonmagnetic body. The coiled resonator 100 is placed between a signal line 200 and a ground 220. The ground 220 is set on the side of the outer covering 10 opposite to the side in contact with the signal line 200 of the coiled resonator 100.

An electric current including a predetermined frequency component flows through the signal line 200. In the present embodiment, the signal line 200 is supposed to be a strip line. However, the signal line 200 is just an example of the conductor passing electric currents, and is not to be considered limited to the form of the conductor.

The coiled resonator 100 is made by coiling a metallic wire. The total length of the coiled resonator 100 (the total length of the metallic wire) is about half the wavelength of an electric current flowing through the signal line 200. In this case, the electric current flowing through the signal line 200 has a frequency in the GHz band, and the coiled resonator 100 has a length of 28 mm.

In FIG. 5, as the coiled resonator 100, the metallic wire is coiled with a central axis 110 as a center. More specifically, the coiled resonator 100 in the shape of a spring is shown in FIG. 5. However, the shape of the coiled resonator 100 is not limited to the coiled shape along a cylindrical surface as shown in FIG. 5. For example, the coiled resonator 100 may have a shape curling along a square pillar. Alternatively, the coiled resonator 100 may have a shape curling along a spherical surface.

The coiled resonator 100 may have a length and a shape as described above. As the coiled resonator 100, coils of coiled metallic wires can be used. As the coiled resonator 100, commercially available resonators (for example, commercially available coils) may be used, or specially made resonators may be used.

The outer covering 10 fixes the position of the coiled resonator 100. As the outer covering 10, resin materials such as Teflon (registered trademark) are suitable. However, the outer covering 10 is just an example of the supporting member for fixing the position of the coiled resonator 100, and the coiled resonator 100 may be fixed by other member.

The central axis 110 of the coiled resonator 100 is parallel to an electric field generated by an electric current flowing through the signal line 200, more particularly, an electric field generated between the signal line 200 and the ground 220. More specifically, the outer covering 10 fixes the coiled resonator 100 so that the central axis 110 is parallel to the electric field. In other words, the coiled resonator 100 is placed so that a difference in electric potential is produced across the ends of the coil in accordance with the gradient of the electric field.

In the example shown in FIG. 5, the central axis 110 is set in a direction from the signal line 200 toward the ground 220. More specifically, the central axis 110 is orthogonal to the plane of the ground 220, and penetrating through the signal line 200. This arrangement makes the central axis 110 parallel to an electric field created by the electric current flowing through the signal line 200 (perpendicular to a magnetic field created by the electric current flowing through the signal line 200).

With respect to the signal line 200, the coiled resonator 100 gives rise to a resonance in response to a specific frequency (resonant frequency) component in the electric field generated by the electric current flowing through the signal line 200.

Figure 6:
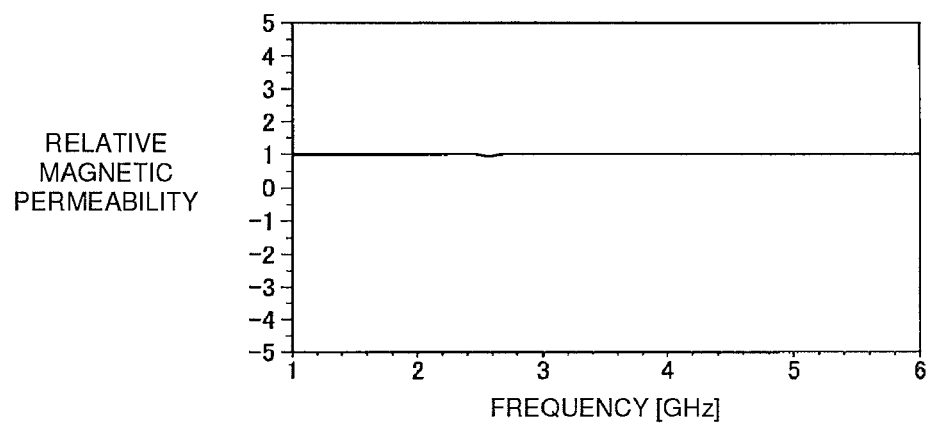
FIG. 6 is a diagram showing the relative magnetic permeability of the metamaterial shown in FIG. 5.
Figure 7:
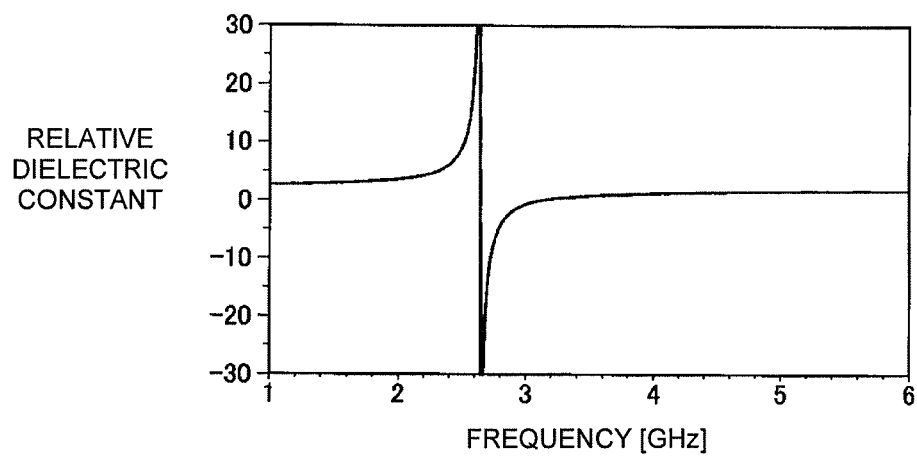
FIG. 7 is a diagram showing the relative dielectric constant of the metamaterial shown in FIG. 5.

With reference to FIGS. 6 and 7, electromagnetic characteristics of the coiled resonator 100 will be described. The relative magnetic permeability and relative dielectric constant exhibited by the metamaterial shown in FIG. 5 are respectively shown in FIGS. 6 and 7. The relative dielectric constant used herein represents the ratio of a dielectric constant to a vacuum dielectric constant, whereas the relative magnetic permeability represents the ratio of a magnetic permeability to a vacuum magnetic permeability. As shown in FIG. 7, the metamaterial shown in FIG. 5 exhibits a negative dielectric constant around 2.6 GHz. On the other hand, the relative magnetic permeability is constantly positive as shown in FIG. 6.

As described above, it is determined that the coiled metallic wire which is ½ the wavelength in length develops a negative dielectric constant. Thus, the metamaterial using the coiled metallic wire can be reduced in size as compared with a metamaterial which develops a negative dielectric constant with use of a linear metallic wire.

Next, an example will be described in which a metallic wire in the shape of a spring is used to develop a metamaterial with a negative magnetic permeability (μ). The metamaterial with a negative magnetic permeability μ is achieved by placing a coiled resonator 100 which has the same length and shape as those of the coiled resonator 100 shown in FIG. 5 so that a central axis 110 of the coiled resonator 100 is parallel to the magnetic field. The thus placed coiled resonator 100 exhibiting a negative magnetic permeability will be described with reference to FIGS. 8 through 10.

Figure 8:
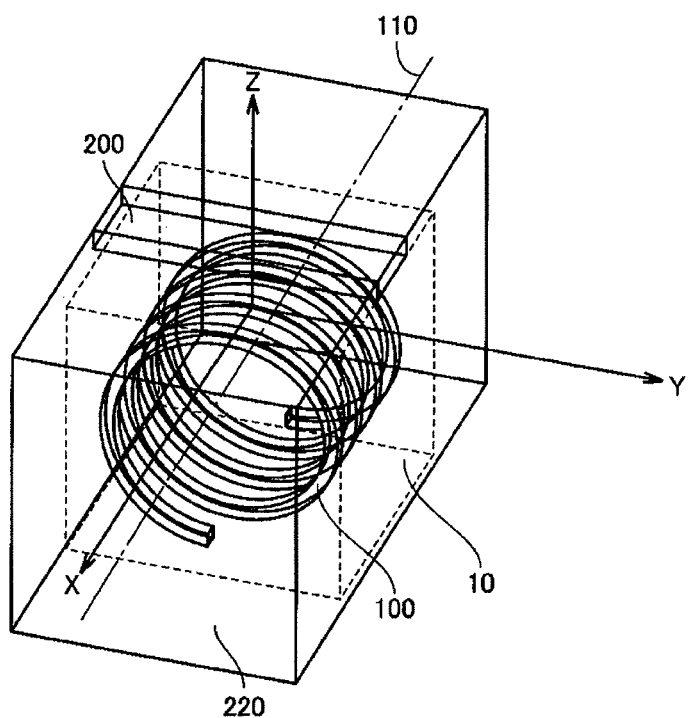
FIG. 8 is a diagram for explaining the configuration of a metamaterial with a negative dielectric constant, which uses a coiled resonator.

FIG. 8 is a diagram for explaining the structure of a metamaterial which develops a negative dielectric constant with the use of a coiled resonator. The metamaterial shown in FIG. 8 is derived from the placement of the coiled resonator 100 shown in FIG. 6 rotated by 90 degrees around the Y axis so that the central axis of the coiled resonator 100 is parallel to a magnetic field generated by an electric current flowing through the signal line 200 (perpendicular to an electric field created by the electric current flowing through the signal line 200).

Figure 9:
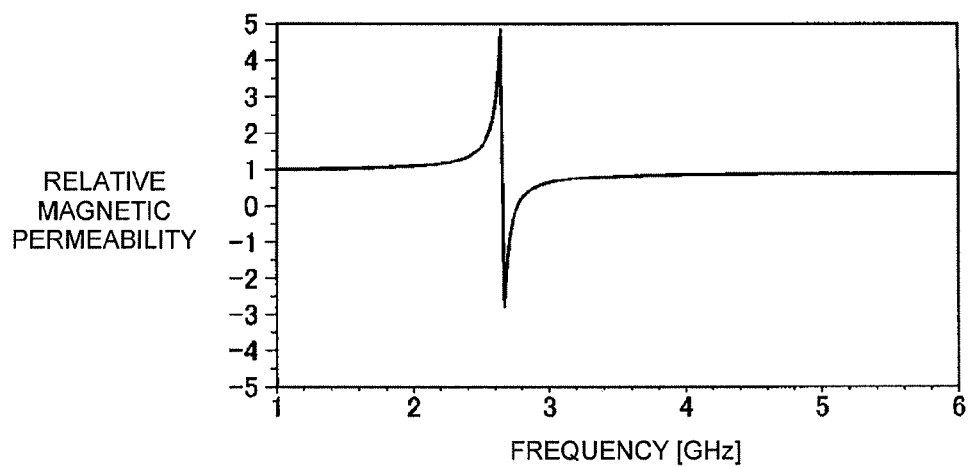
FIG. 9 is a diagram showing the relative magnetic permeability of the metamaterial shown in FIG. 8.
Figure 10:
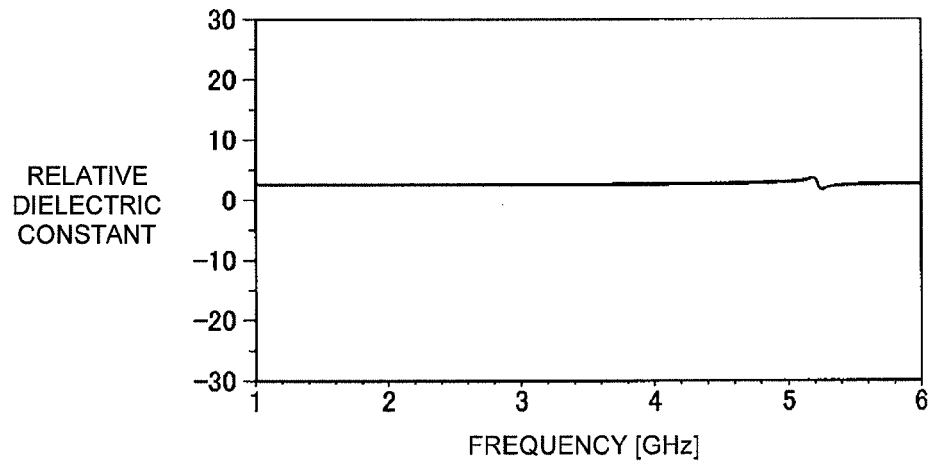
FIG. 10 is a diagram showing the relative dielectric constant of the metamaterial shown in FIG. 8.

The relative magnetic permeability and relative dielectric constant exhibited by the metamaterial shown in FIG. 8 are respectively shown in FIGS. 9 and 10. As shown in FIG. 9, the metamaterial shown in FIG. 8 exhibits a negative magnetic permeability around 2.6 GHz. On the other hand, the relative dielectric constant is constantly positive as shown in FIG. 10.

It is determined that the central axis changed in direction as described above causes the coiled resonator 100 which has the same structure to both exhibit a negative dielectric constant in some cases and exhibit a negative magnetic permeability in some cases. It is to be noted that the coiled resonator 100 is placed so that the central axis direction is nonorthogonal to the magnetic field direction and the electric field direction exhibits a negative dielectric constant and magnetic permeability at the same time.

[Metamaterial Using Capacitor and Coil]

The use of the capacitive resonator and coiled resonator as described above can achieve a metamaterial. More specifically, a negative dielectric constant can be developed with the use of the coiled resonator. A negative magnetic permeability can be developed with the use of a capacitive resonator or a coiled resonator oriented differently from the coiled resonator for a negative dielectric constant.

Figure 11:
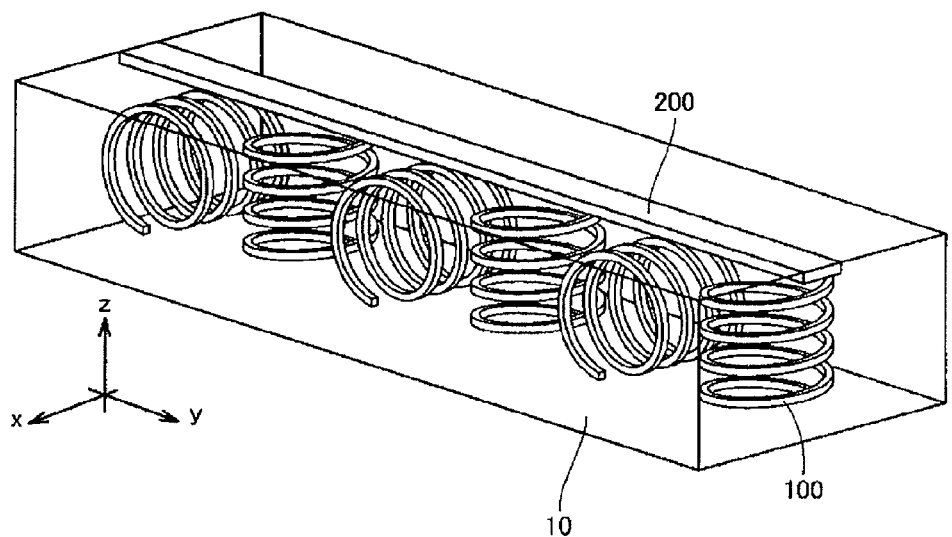
FIG. 11 is a diagram illustrating an example of the arrangement of coiled resonators.

However, in order to achieve a left-handed metamaterial with the use of this combination of resonators, it is necessary to place the resonators properly. According to the principle described above, it is conceivable to arrange multiple coiled resonators as shown in FIG. 11. More specifically, it is conceivable to arrange a plurality of coiled resonators 100 so that the adjacent coiled resonators 100 have central axes which differ by 90 degrees. In addition, it is also conceivable to use capacitive resonators in place of the coiled resonators 100 with horizontal central axes in FIG. 11. In reality, it is difficult for this alternately periodic arrangement of a resonator for a negative dielectric constant and a resonator for a negative magnetic permeability to generate a negative dielectric constant and magnetic permeability at the same time.

This difficulty is caused for the following reasons. First, the first reason is that the dielectric constant and/or the magnetic permeability may have a smaller absolute value due to discontinuity of the respective units in the method of periodically arranging the unit for a negative dielectric constant and the unit for a negative magnetic permeability alternately.

Furthermore, the second reason is that such an electric field or a magnetic field that generally cancels a developed negative dielectric constant or negative magnetic permeability may be caused in a region in which the unit for a negative dielectric constant or the unit for a negative magnetic permeability is not placed. For example, a positive magnetic permeability is developed in the space between the units for a negative magnetic permeability (in the placement of the unit for a negative dielectric constant), and the negative magnetic permeability developed in the units will be canceled as a whole. Therefore, the negative magnetic permeability is less likely to be developed. The same applies to the dielectric constant.

Figure 12:
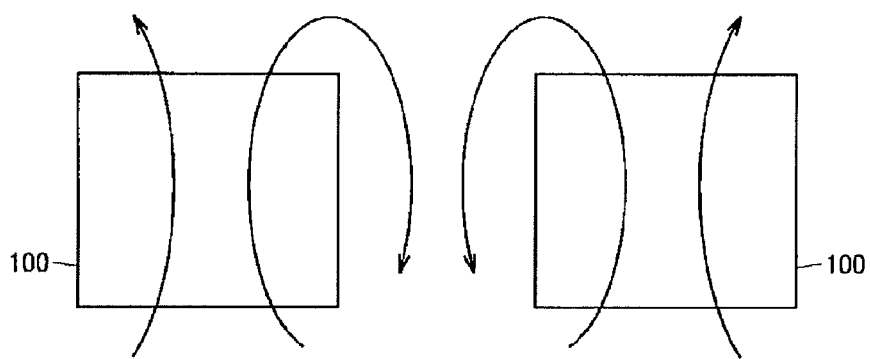
FIG. 12 is a diagram schematically illustrating two coiled resonators placed spaced apart from each other and a generated electric field.

A supplementary explanation of the second reason will be made in content with reference to FIG. 12. FIG. 12 schematically illustrates two coiled resonators 100 placed spaced apart from each other at a predetermined distance. Each coiled resonator 100 exhibits a negative dielectric constant in its existence region. More specifically, each coiled resonator 100 generates an upward electric field in FIG. 12. On the other hand, the electric field goes around into the region in which no coiled resonator 100 is placed, thereby generating a downward electric field in FIG. 12. As a whole, the upward electric field and the downward electric field cancel each other to thus fail to provide a sufficiently negative dielectric constant. The same can be said for the negative magnetic permeability.

In the case of a conventional metamaterial composed of a combination of a SRR and a metal rod, the thickness can be ignored for both the SRR and the metal rod, and resonators can be thus arranged at a high density even when a large-size metamaterial is produced as a whole. In contrast, when a three-dimensional coiled resonator is to be employed instead of the metal rod for the reduction in size, the problems as described above could be caused.

In each embodiment described below, an arrangement of resonators will be described for solving the above problems and achieving a left-handed metamaterial which can be reduced in size.

First Embodiment

Figure 13:
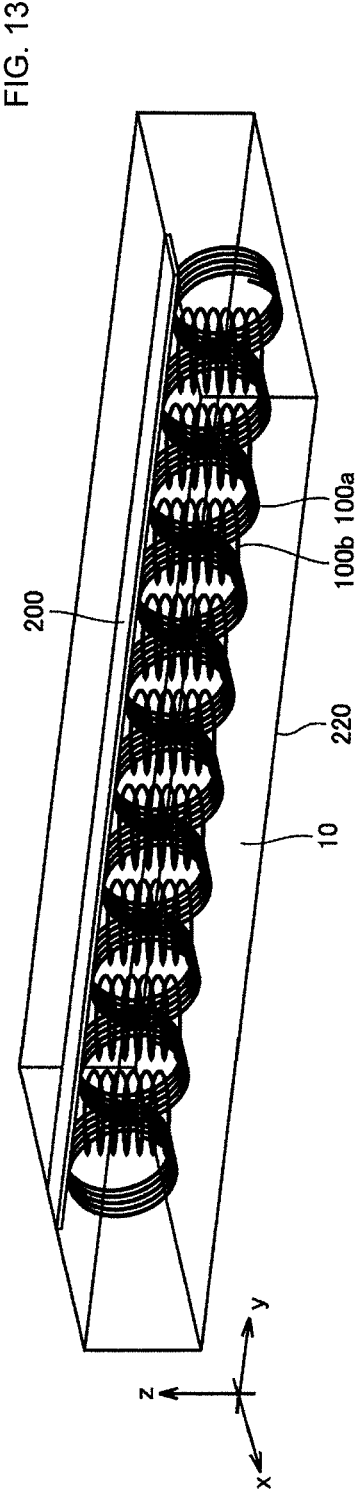
FIG. 13 is a diagram illustrating the structure of a metamaterial according to a first embodiment.

The structure of a metamaterial according to the first embodiment will be described with reference to FIG. 13. As shown in FIG. 13, the metamaterial according to the first embodiment includes a plurality of coiled resonators 100a and a plurality of coiled resonators 100b, and an outer covering 10 for fixing the positions of the coiled resonators 100a and coiled resonators 100b.

It is to be noted that the outer covering 10 is an example of a supporting member for fixing the positions of the coiled resonators 100a and coiled resonators 100b. The coiled resonators 100a and the coiled resonators 100b may be fixed by other member.

The metamaterial is placed around a signal line 200. It is to be noted that the signal line 200 is an example of a conductor through which an electric current flows, and other type of conductor may be employed in place of the signal line 200.

Each of the coiled resonators 100a is fixed by the outer covering 10 so that the central axes of the coiled resonators 100a are parallel to the direction of a magnetic field (perpendicular to the direction of an electric field) generated by an electric current flowing through the signal line 200. The plurality of coiled resonators 100a are each fixed in a one-dimensionally continuous position to the direction of the electric current flowing through the signal line 200.

On the other hand, each of the coiled resonators 100b is placed so that the central axis thereof is parallel to the direction of an electric field (perpendicular to the direction of a magnetic field) generated by an electric current flowing through the signal line 200. Therefore, the central axis of the coiled resonator 100b corresponds to the central axis of the coiled resonator 100a rotated by 90 degrees with the direction of the electric current flowing through the signal line 200 as an axis. In addition, the plurality of coiled resonators 100b are each fixed in a one-dimensionally continuous position to the direction of the electric current flowing through the signal line 200.

Each of the coiled resonators 100a and coiled resonators 100b is placed between the signal line 200 and a ground 220. The ground 220 serves as a reference potential. The coiled resonators 100a and the coiled resonators 100b have no electrical contact with each other, and have a floating state in which the coiled resonators 100a and the coiled resonators 100b are not electrically connected to the signal line 200 and the ground 220.

The metamaterial shown in FIG. 13 according to the present embodiment is different as compared with the metamaterial shown in FIG. 11 in that the coiled resonator 100b is placed in an internal region between the two adjacent coiled resonators 100a. More specifically, the adjacent coiled resonators 100a and the coiled resonator 100b are disposed so as to be linked alternately in the shape of a chain. Accordingly, it is possible to place the coiled resonators 100a in a spatially continuous manner.

The term "spatially continuous" used herein refers to the distance between the adjacent coiled resonators 100a which is a sufficiently short interval as compared with the size of the coiled resonator 100a. As long as such a magnetic field that cancels a negative magnetic permeability developed in the coiled resonators 100a is sufficiently small in the space between the adjacent coiled resonators 100a, the coiled resonators 100a can be said to be spatially continuous.

The length of the coiled metallic wire included in the coiled resonator 100a is substantially ½ the resonant wavelength corresponding to the resonant frequency at which a negative magnetic permeability is to be developed. Therefore, the coiled resonator 100a develops a negative magnetic permeability at the resonant frequency.

In addition, the length of the coiled metallic wire included in the coiled resonator 100b is substantially ½ the resonant wavelength corresponding to the resonant frequency at which a negative dielectric constant is to be developed. Therefore, the coiled resonator 100b develops a negative dielectric constant at the resonant frequency.

Furthermore, the coiled resonators 100a and the coiled resonators 100b are supposed to be designed so as to have a common resonant frequency (or also referred to as a resonant wavelength).

As described above, in the case of the metamaterial according to the present embodiment, the coiled resonators 100a and the coiled resonators 100b are disposed so as to be linked alternately in the shape of a chain, thereby resulting in the coiled resonators 100a placed in a spatially continuous manner. In addition, the coiled resonators 100b are also placed in a spatially continuous manner. Accordingly, the metamaterial according to the present embodiment causes no action to cancel the dielectric constant and the magnetic permeability, and thus develops a negative magnetic permeability and a negative dielectric constant at the same time. More specifically, the metamaterial according to the present embodiment serves as a left-handed metamaterial.

Further, the one-dimensionally arranged resonators shown in FIG. 13 may be arranged in the same plane to constitute a planar metamaterial. Furthermore, the planar metamaterial may be stacked to constitute a three-dimensional metamaterial.

The metamaterial according to the present embodiment can be created in accordance with, for example, a stacking method, that is, a method of stacking multiple planar structures with metallic objects disposed in an outer material.

Second Embodiment

The metamaterial described above according to the first embodiment is composed of a plurality of coiled resonators linked like a chain. In contrast, a metamaterial in which a resonator for developing a negative magnetic permeability is put in a coiled resonator for developing a negative dielectric constant will be described in the second embodiment.

Figure 14:
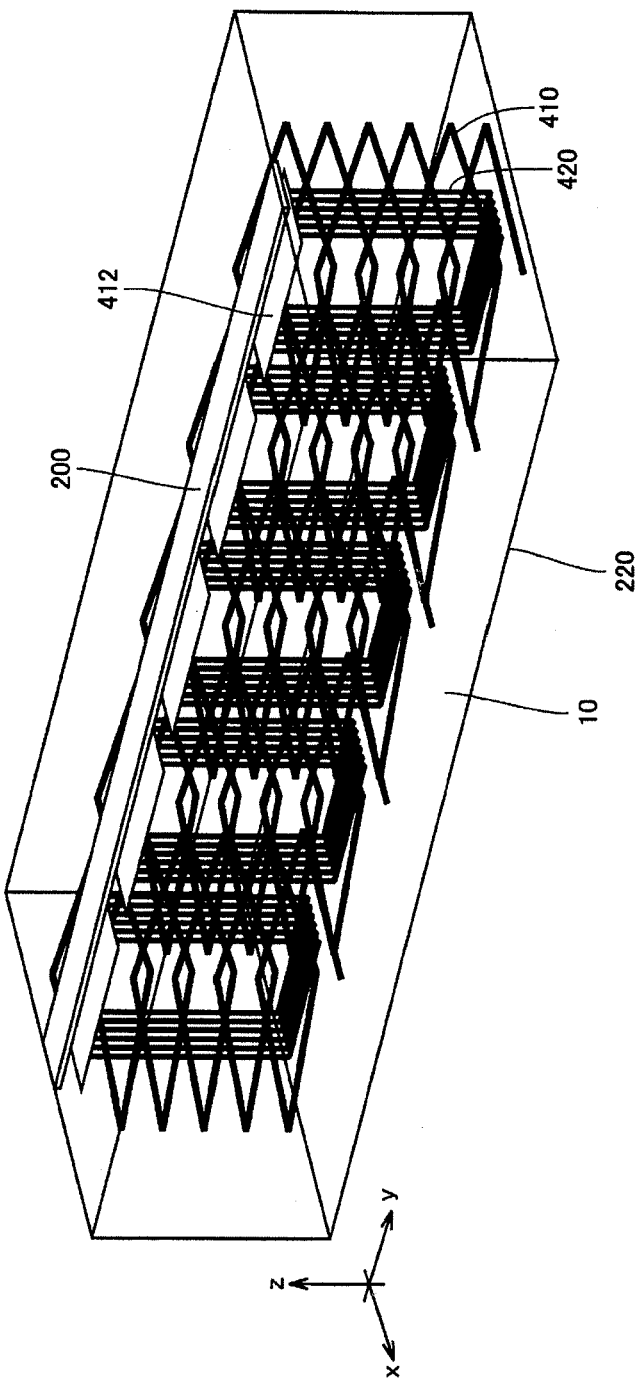
FIG. 14 is a diagram illustrating the structure of a metamaterial according to a second embodiment.

The structure of a metamaterial according to the second embodiment will be described with reference to FIG. 14. As shown in FIG. 14, the metamaterial according to the second embodiment includes a plurality of (five in FIG. 14) sets (units) each composed of a first coiled resonator 410, a conductive plate 412, and a second coiled resonator 420, and an outer covering 10.

The outer covering 10 surrounds the first coiled resonators 410, the conductive plates 412, and the second coiled resonators 420, and fixes the positions of these resonators and plates. As in the case of the first embodiment, the outer covering 10 is an example of the supporting member.

The metamaterial is placed near the signal line 200. As in the case of the first embodiment, the signal line 200 is an example of the conductor.

The first coiled resonator 410 is placed so that the central axis thereof is parallel to the direction of an electric field generated by an electric current flowing through the signal line 200. Therefore, the coiled resonator 100b has a negative dielectric constant at a resonant frequency depending on the total length of the coil.

The first coiled resonator 410 has a metallic wire wound in a rectangular shape rather than a circular shape, unlike the coiled resonators 100a and the coiled resonators 100b shown in FIG. 13. This structure can ensure a resonant line in a smaller space, thereby allowing the metamaterial to be reduced in size. However, a circular coil may be used as in the case of the first embodiment. Reversely, it is also possible to use a coil which has the shape shown in FIG. 14 in the first embodiment.

The conductive plate 412 is located under the signal line 200, and connected to the first coiled resonator 410. The conductive plate 412 increases the capacitance between the conductive plate 412 and the signal line 200, and increases the absolute value of a negative dielectric constant at the resonant frequency. In addition, the conductive plate 412 can shortens the substantial length of λ/2 due to the wavelength shortening effect from the capacitance. In FIG. 14, the conductive plate 412 is connected to only the upper side of the first coiled resonator 410. This connection is provided in order to put the second coiled resonator 420 into the first coiled resonator 410 from the bottom. However, a conductive plate may also be provided on the lower side of the first coiled resonator 410, such as by the subsequent attachment of the conductive plate. The upper and lower conductive plates can further increase the absolute value of a negative dielectric constant, and shorten the resonant wavelength. It is to be noted that the conductive plate 412 may not be provided, depending on the required value of the dielectric constant, or the like.

The second coiled resonator 420 is placed so that the central axis thereof is parallel to the direction of a magnetic field generated by an electric current flowing through the signal line 200. Therefore, the second coiled resonator 420 develops a negative magnetic permeability at a resonant frequency depending on the total length of the coil. It is to be noted that the first coiled resonator 410 and the second coiled resonator 420 are supposed to be designed so as to have a common resonant frequency.

The first coiled resonator 410 and the second coiled resonator 420 are placed between the signal line 200 and a ground 220. The ground 220 serves as a reference potential. The first coiled resonators 410 and the second coiled resonators 420 have no electrical contact with each other, and have a floating state in which the first coiled resonators 410 and the second coiled resonators 420 are not electrically connected to the signal line 200 and the ground 220.

The sets (units) each composed of the first coiled resonator 410, the conductive plate 412, and the second coiled resonator 420 are placed in a spatially continuous manner. The term "spatially continuous" used herein means that the distance between adjacent units is a sufficiently small interval with respect to the size of the unit, as in the case of the first embodiment.

Since the units are continuously arranged, the metamaterial according to the present embodiment develops a negative dielectric constant and a negative magnetic permeability at the same time, as in the case of the metamaterial according to the first embodiment.

It is to be noted that while FIG. 14 shows an example in which five units are arranged continuously in a line along the electric current direction, the arrangement of units is not limited to the arrangement in FIG. 14. For example, five or more units may be arranged in a line. Alternatively, it is also possible to arrange units two-dimensionally or three-dimensionally.

Figure 15:
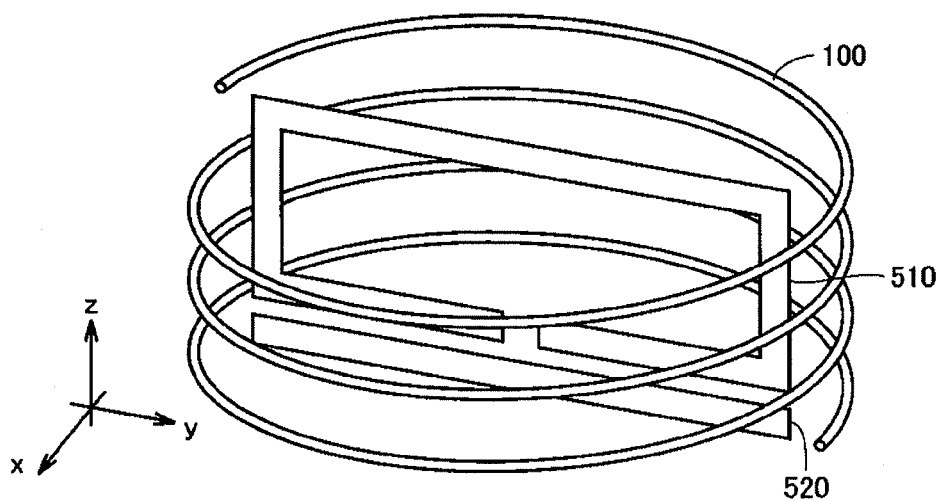
FIG. 15 is a diagram illustrating another structure of the metamaterial according to the second embodiment.

In addition, the second coiled resonator 420 is an example of the resonator for developing a negative magnetic permeability, and other resonators can also be used instead of the second coiled resonator 420. FIG. 15 shows one unit included in a metamaterial using a split ring resonator instead of the coiled resonator. As shown in FIG. 15, this unit includes a coiled resonator 100, and split ring 510 and a linear metallic plate 520 each placed in the coiled resonator 100. The metallic plate 520 is provided to compensate for a capacitance in a discontinuous section of the split ring 510 and thus decrease the resonant frequency.

Third Embodiment

In the first and second embodiments described above, negative dielectric constant and magnetic permeability are developed by placing resonators such as coils in place. In contrast, a metamaterial for which a resonator for a negative dielectric constant and a resonator for a negative magnetic permeability are built in one chip with the use of a technique such as a multilayer substrate will be described in the third embodiment.

Figure 16:
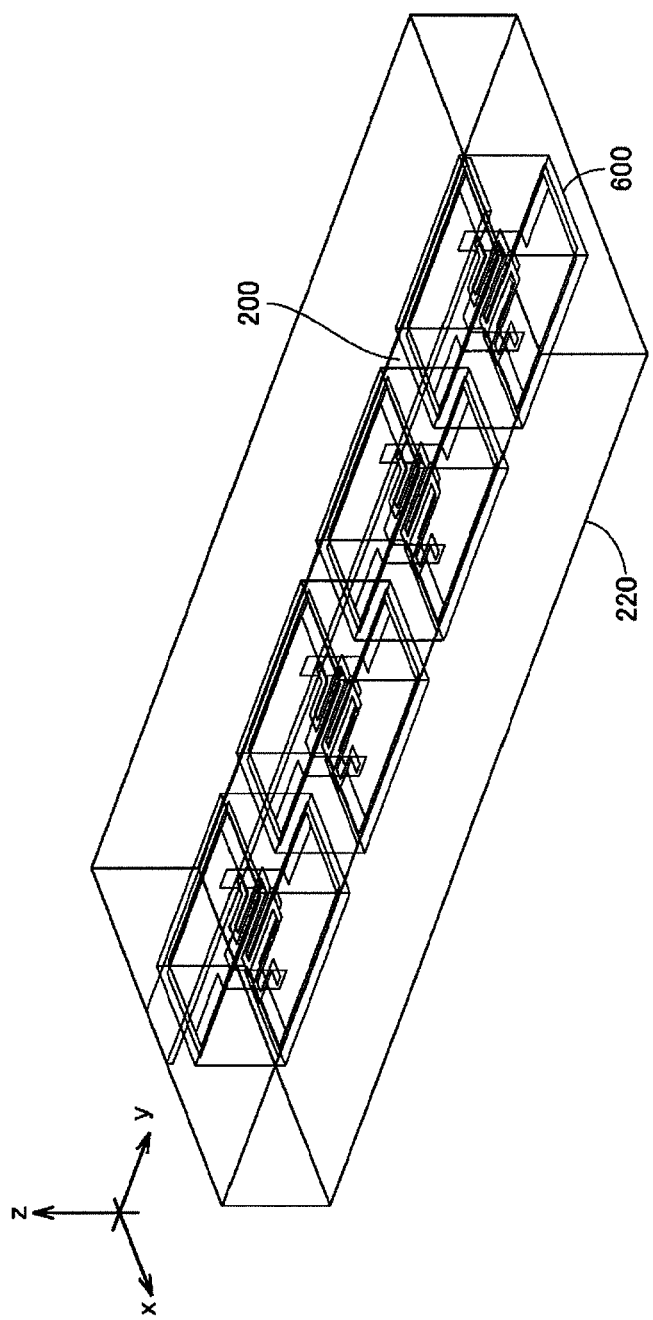
FIG. 16 is a schematic view of a metamaterial according to a third embodiment.

A metamaterial according to the third embodiment will be described with reference to FIG. 16. The metamaterial according to the third embodiment includes a plurality of units 600 in which a resonator for a negative dielectric constant and a resonator for a negative magnetic permeability are built in a substrate material.

Each unit 600 is placed immediately below a signal line 200 and between the signal line 200 and a ground 220. The ground 220 serves as a reference potential. In addition, the respective units 600 are arranged in a spatially continuous manner. While an example of arranging four units 600 in a direction along the signal line 200 is shown in FIG. 16, the arrangement of units 600 is not to be considered limited to the arrangement in FIG. 16, as in the case of the other embodiments.

Figure 17:
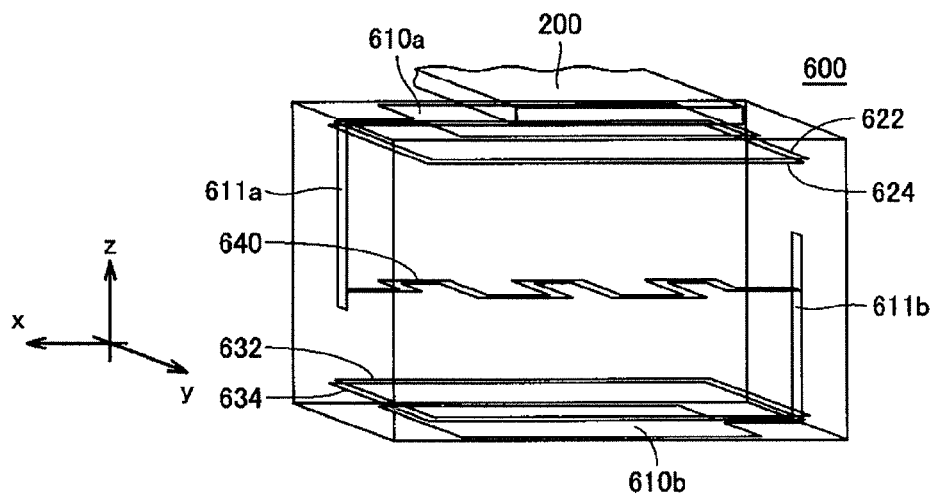
FIG. 17 is a perspective view of a unit included in the metamaterial according to the third embodiment.
Figure 18:
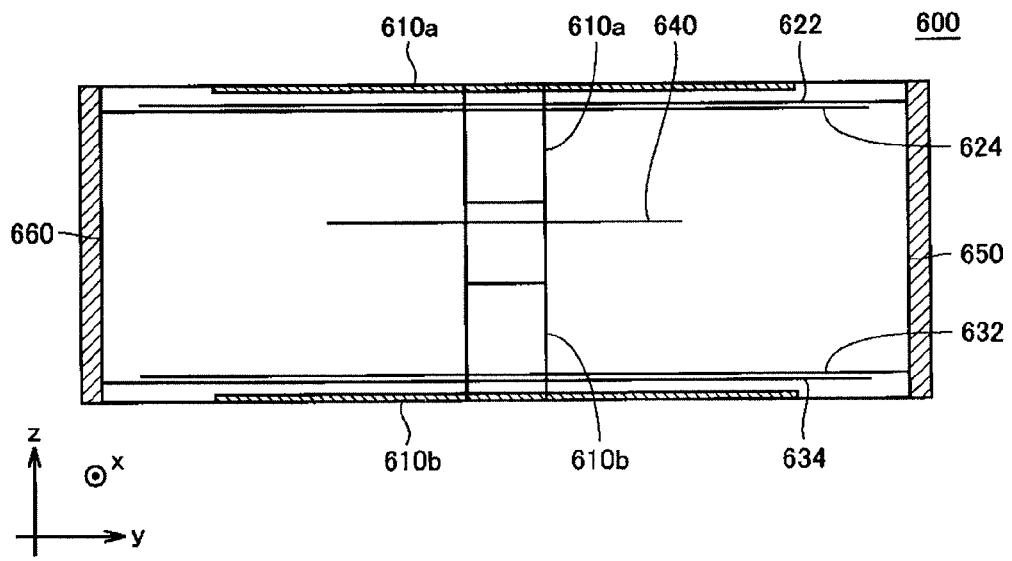
FIG. 18 is a side view of the unit included in the metamaterial according to the third embodiment viewed from the y direction.

The structure of the unit 600 will be described with reference to FIGS. 17 and 18. FIG. 17 is a perspective view of the unit 600. FIG. 18 is a side view of the unit 600 viewed from the y direction.

As shown in FIG. 17, the unit 600 includes an uppermost part electrode 610a, a lowermost part electrode 610b, a first internal electrode 622, a second internal electrode 624, a third internal electrode 632, a fourth internal electrode 634, and a line 640. In addition, as shown in FIG. 18, the unit 600 further includes a first external electrode 650 and a second external electrode 660.

The uppermost part electrode 610a is placed above the first internal electrode 622, the second internal electrode 624, the third internal electrode 632, and the fourth internal electrode 634 (in a position with larger z coordinates). The lowermost part electrode 610b is placed below the first internal electrode 622, the second internal electrode 624, the third internal electrode 632, and the fourth internal electrode 634 (in a position with smaller z coordinates). The uppermost part electrode 610a has a side section 611a extending in the −z direction. The lowermost part electrode 610b has a side: section 611b extending in the +z direction. In addition, the uppermost part electrode 610a is placed just under the signal line 200.

The line 640 connects the side section 611a of the uppermost part electrode 610a extending in the −z direction to the side section 611b of the lowermost part electrode 610b extending in the +z direction. The line 640 electrically connects the uppermost part electrode 610a and lowermost part electrode 610b to the side sections 611a, 611b, thereby serving as a part of the $\lambda/2$ line for achieving a negative dielectric constant.

The length of the line composed of the line 640 and the side sections 611a, 611b is designed depending on the resonant frequency. Since the line has a length of $\lambda/2$ in this case, the line 640 is regarded as a Meander line drawn in the central layer. However, the shape of the line 640 is not limited to this Meander line, and for example, a helical line and a spiral line may be employed.

It is to be noted that the uppermost part electrode 610a and the lowermost part electrode 610b are provided to increase the absolute value of a negative dielectric constant and shorten the resonant wavelength as in the case of the conductive plate 412 shown in FIG. 14. It is also possible to omit the uppermost part electrode 610a and the lowermost part electrode 610b, depending on the required negative dielectric constant or resonant wavelength. However, the both ends of the line 640 are preferably located outside the capacitive resonator so that electric charges are accumulated on the both ends.

The first internal electrode 622 and the second internal electrode 624 are placed closely and opposed to each other. In addition, the third internal electrode 632 and the fourth internal electrode 634 are placed closely and opposed to each other. The pair of first internal electrode 622 and second internal electrode 624 (referred to as an upper pair of electrodes) is placed on the side of the uppermost part electrode 610a. The pair of third internal electrode 632 and fourth internal electrode 634 (referred to as a lower pair of electrodes) is placed on the side of the lowermost part electrode 610b. Me respective internal electrode planes are placed parallel to the direction of a magnetic field (perpendicular to the direction of an electric field) generated by an electric current flowing through the signal line 200.

The first external electrode 650 electrically connects the first internal electrode 622 and the third internal electrode 632 as shown in FIG. 18. The second external electrode 660 electrically connects the second internal electrode 624 and the fourth internal electrode 634 as shown in FIG. 18. The external electrode planes 650 and 660 are placed parallel to the direction of a magnetic field (perpendicular to the direction of an electric field) generated by an electric current flowing through the signal line 200.

The line 640, the uppermost part electrode 610a, and the lowermost part electrode 610b develop a negative dielectric constant. The first to fourth internal electrodes 622, 624, 632, 634 and the first and second external electrodes 650, 660 form a capacitive resonator including two upper electrodes and two lower electrodes to develop a negative magnetic permeability. It will be understood that the $\lambda/2$ line for developing a negative dielectric constant and the capacitive resonator for developing a negative magnetic permeability are not electrically connected directly to each other. In addition, the $\lambda/2$ line and the capacitive resonator in a floating state are not electrically connected to the signal line 200 and the ground 220. In addition, the respective units 600 are not brought into contact with each other.

As can be seen from the description above, the positional relationship between the resonator for $\mu<0$ and the resonator for $\in<0$ in the metamaterial according to the present embodiment is reversed from that of the first and second embodiments. The metamaterial according to the present embodiment includes an internal space, in which the resonator for achieving $\in<0$ is placed in the resonator for achieving $\mu<0$.

When the plurality of units 600 as described above is placed in a spatially continuous manner, the metamaterial according to the present embodiment functions as a left-handed metamaterial. The metamaterial according to the present embodiment is created by building a resonator for a negative dielectric constant and a resonator for a negative magnetic permeability in a unit, and thus industrially manufactured without any difficulty.

Fourth Embodiment

In the fourth embodiment, a metamaterial will be described which uses a split ring resonator instead of the capacitive resonator according to the third embodiment.

Figure 19:
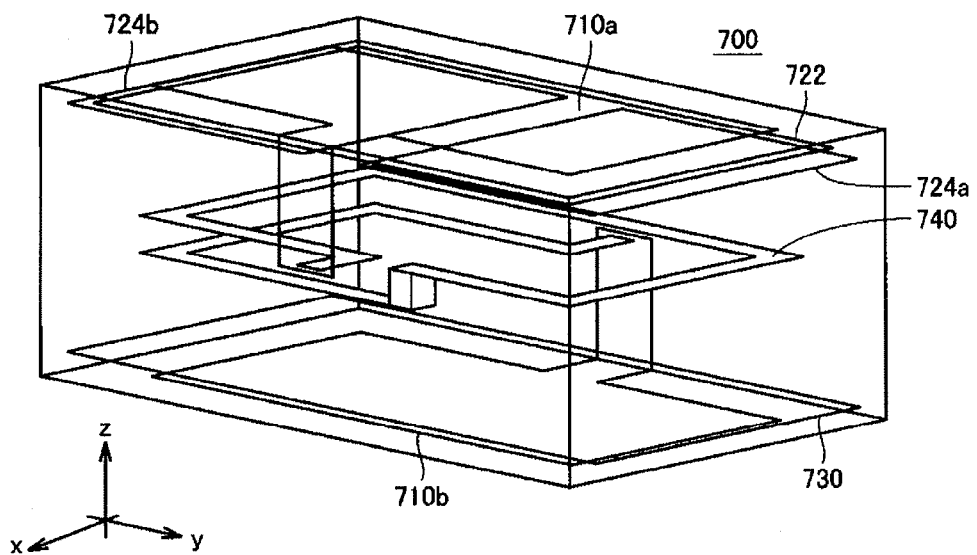
FIG. 19 is a perspective view of a unit included in a metamaterial according to a fourth embodiment.
Figure 20:
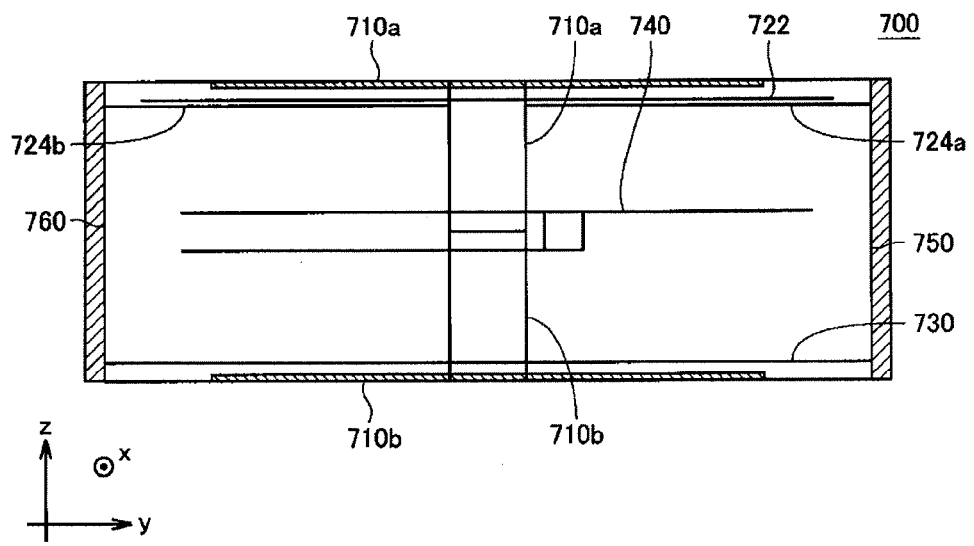
FIG. 20 is a side view of the unit included in the metamaterial according to the fourth embodiment.

FIGS. 19 and 20 show the structure of one unit 700 of a metamaterial according to the fourth embodiment. FIG. 19 is a perspective view of the unit 700. FIG. 20 is a side view of the unit 700.

Referring to FIG. 19, the unit 700 includes an uppermost part electrode 710a, a lowermost part electrode 710b, a first internal electrode 722, a second internal electrode 724a, a third internal electrode 724b, a fourth internal electrode 730, and a line 740. Referring to FIG. 20, the unit 700 further includes a first external electrode 750 and a second external electrode 760.

The uppermost part electrode 710a and the lowermost part electrode 710b have the same structures as the uppermost part electrode 610a and lowermost part electrode 610b according to the third embodiment, and are placed outside any of the internal electrodes.

The line 740 electrically connects the uppermost part electrode 710a and the lowermost part electrode 710b. The line 740 serves as a part of the $\lambda/2$ line as in the case of the line 640 according to the third embodiment to develop a negative dielectric constant. It is to be noted that a helical structure curling one and half in a horizontal plane is employed as the line 740 in the present embodiment.

The second internal electrode 724a and the third internal electrode 724b are placed spaced apart at a predetermined distance in the same plane. The first external electrode 750 electrically connects the second internal electrode 724a to the fourth internal electrode 730. The second external electrode 760 electrically connects the third internal electrode 724b to the fourth internal electrode 730. More specifically, the second internal electrode 724a, the first external electrode 750, the third internal electrode 724b, the second external electrode 760, and the third internal electrode 730 have the same structure as a split ring resonator. Accordingly, these electrodes develop a negative magnetic permeability.

The first internal electrode 722 is placed so as to be opposed to the second internal electrode 724a and the third internal electrode 724b, and so as not to come into electrical contact with the second internal electrode 724a and the third internal electrode 724b. The first internal electrode 722 serves to compensate for a capacitance in a discontinuous section between the second internal electrode 724a and the third internal electrode 724b and thus decrease the resonant frequency, as in the case of the metallic plate 520 in FIG. 15.

Fifth Embodiment

As another example of a metamaterial in which a resonator for a negative dielectric constant and a resonator for a negative magnetic permeability are built in one chip, a resonator for a negative magnetic permeability can also be placed in a coil placed circumferentially, as in the case of the second embodiment. In the fifth embodiment, an example of such a metamaterial will be given.

Figure 21:
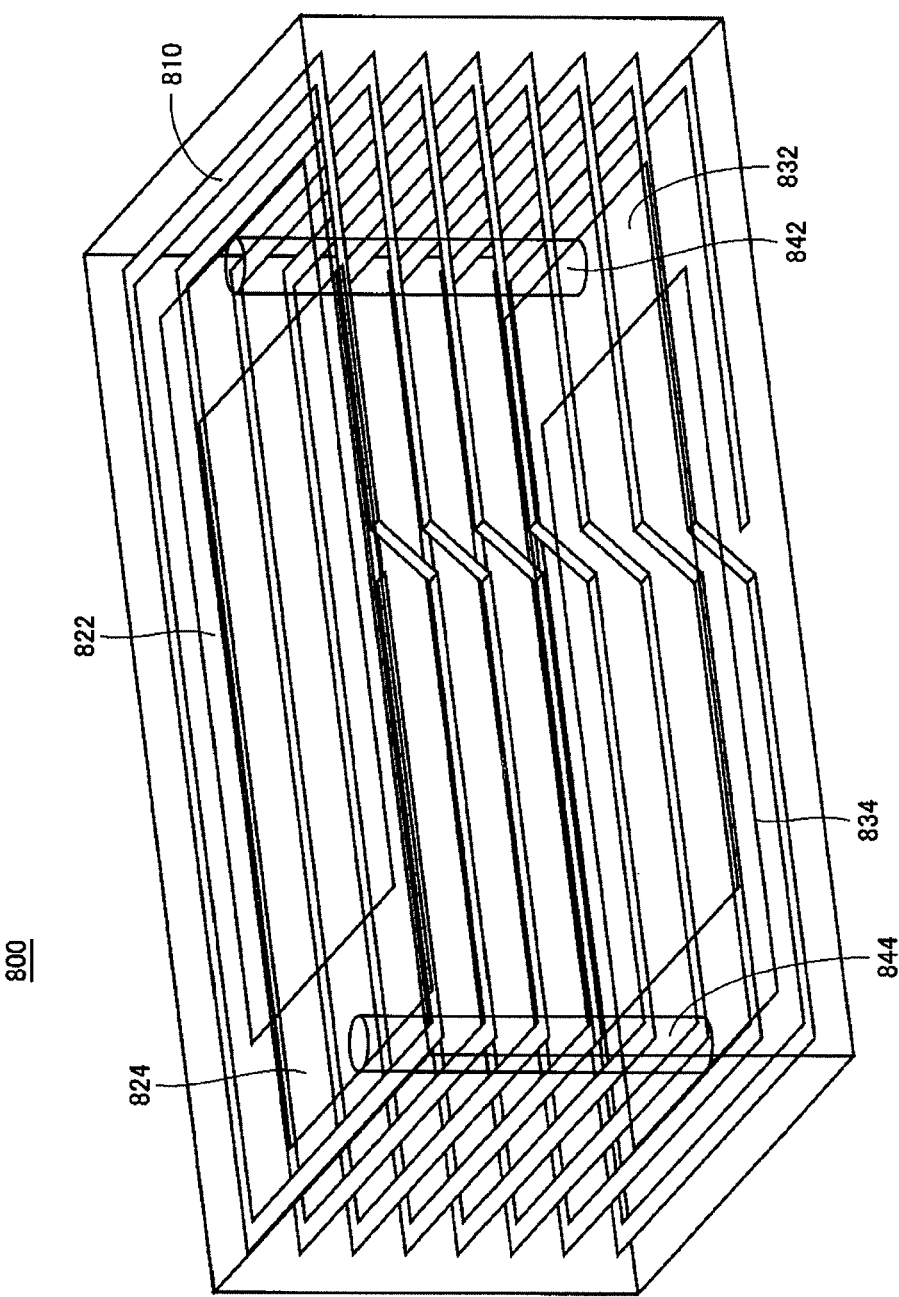
FIG. 21 is a perspective view of a unit included in a metamaterial according to a fifth embodiment.
Figure 22:
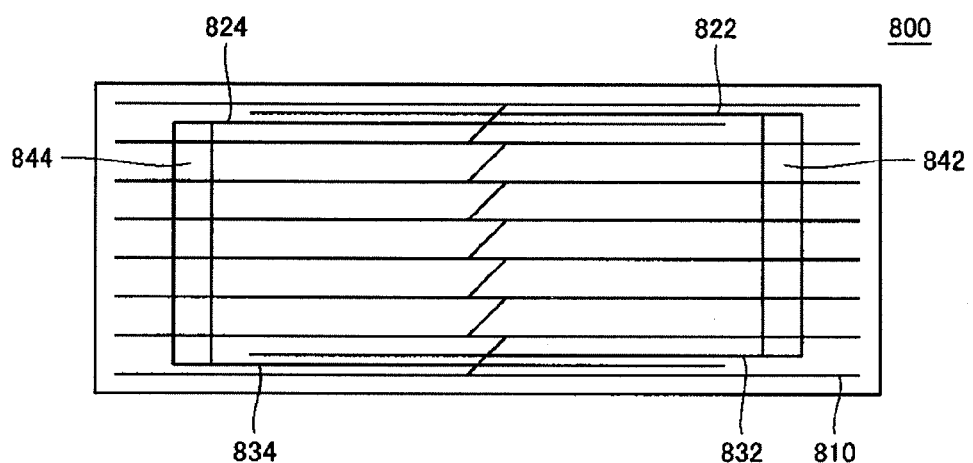
FIG. 22 is a side view of the unit included in the metamaterial according to the fifth embodiment.
Figure 23:
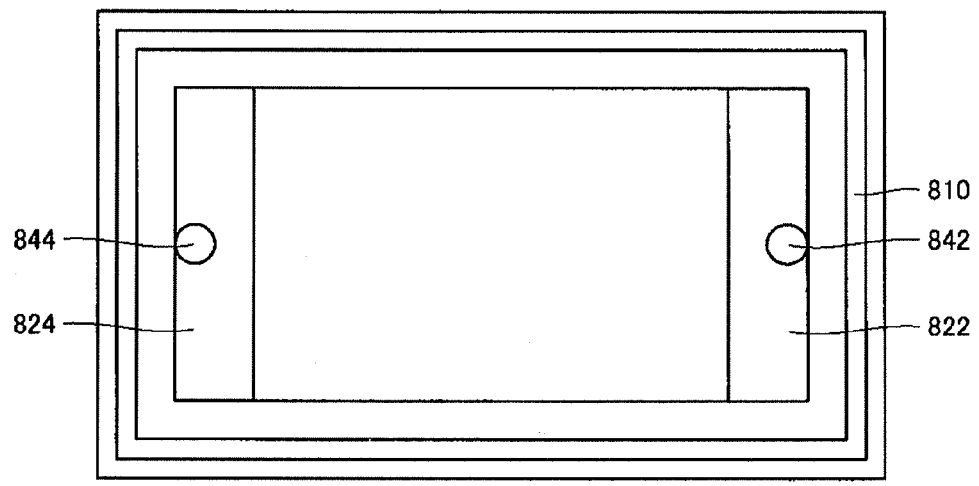
FIG. 23 is a top view of the unit included in the metamaterial according to the fifth embodiment.

The structure of one unit 800 of a metamaterial according to the fifth embodiment will be described with reference to FIGS. 21 to 23. FIG. 21 is a perspective view of the unit 800. FIG. 22 is a side view of the unit 800. FIG. 23 is a top view of the unit 800.

The unit 800 includes a coiled conductor 810, a first electrode 822, a second electrode 824, a third electrode 832, a fourth electrode 834, a first via 842, and a second via 844.

The coiled conductor 810 wraps around a region of the unit 800 closer to the surface more than once (8 times in the example shown here). The coiled conductor 810 is placed to surround the first electrode 822, the second electrode 824, the third electrode 832, the fourth electrode 834, the first via 842, and the second via 844.

The first electrode 822 and the second electrode 824 are placed closely and opposed to each other. In addition, the first electrode 822 and the second electrode 824 are located to be deviated from each other in the horizontal plane.

The third electrode 832 and the fourth electrode 834 are placed closely and opposed to each other. In addition, the third electrode 832 and the fourth electrode 834 are located to be deviated from each other in the horizontal plane.

The pair of first electrode 822 and second electrode 824 is formed in an upper section in the unit 800. The pair of third electrode 832 and fourth electrode 834 is formed in a lower section in the unit 800. It is to be noted that the terms "upper section" and "lower section" used herein are related to the examples shown in FIGS. 21 and 21.

The first via 842 electrically connects the first electrode 822 to the third electrode 832. In addition, the second via 844 electrically connects the second electrode 824 to the fourth electrode 834.

In the structure described above, the first to fourth electrodes 822, 824, 832, 834, and the first and second vias 842, 844 function as a capacitive resonator to develop a negative magnetic permeability.

The configuration according to the present embodiment can increase the length of the line (coil) while keeping the size of the unit, as compared with the second and third embodiments. Therefore, a low resonant frequency can be obtained.

Sixth Embodiment

In the units (metamaterial units) included in the metamaterials according to the third and fourth embodiments described above, the resonator for a negative magnetic permeability has an external electrode for connecting internal electrodes. In contrast, in the case of a resonator for a negative magnetic permeability according to the present embodiment, a conductive section for connecting internal electrodes is achieved by a via.

Figure 24:
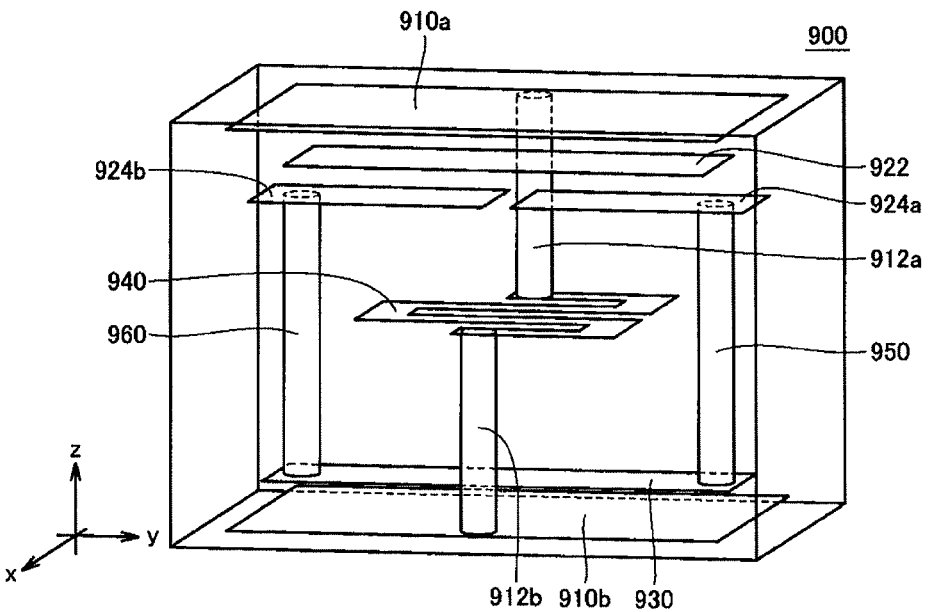
FIG. 24 is a perspective view of a unit included in a metamaterial according to the sixth embodiment.
Figure 25:
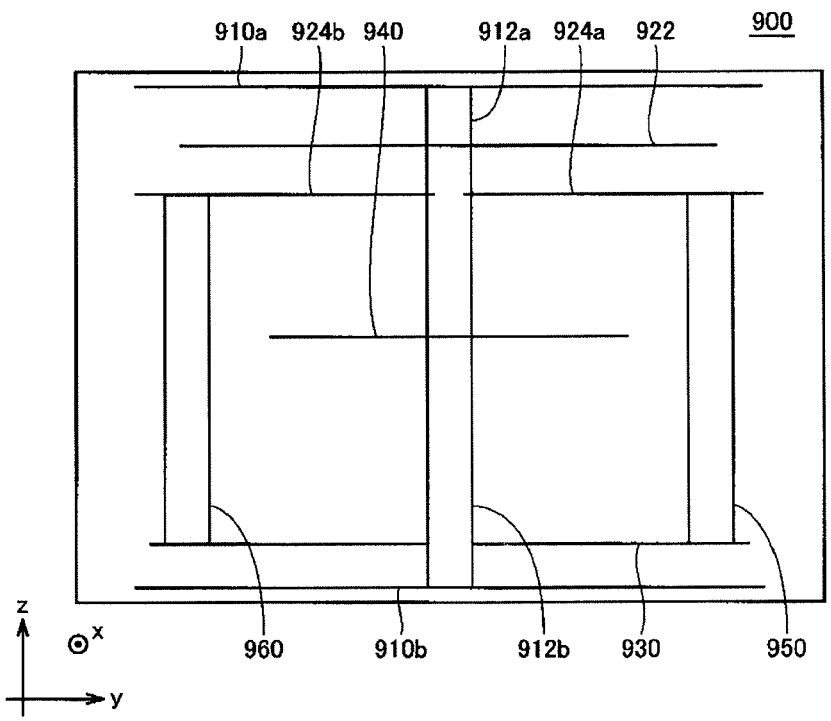
FIG. 25 is a front view of the unit included in the metamaterial according to the sixth embodiment.
Figure 26:
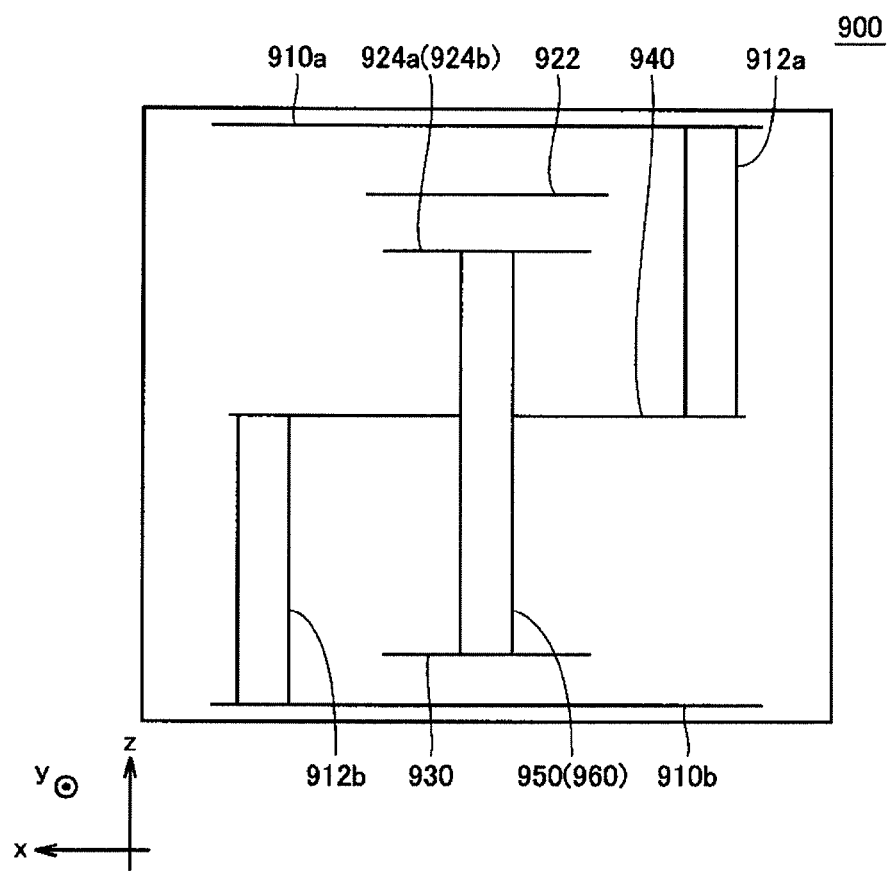
FIG. 26 is a side view of the unit included in the metamaterial according to the sixth embodiment.

The structure of one unit 900 of a metamaterial according to the sixth embodiment will be described with reference to FIGS. 24 to 26. FIG. 24 is a perspective view of the unit 900. FIG. 25 is a front view of the unit 900. FIG. 26 is a side view of the unit 900.

Referring to FIGS. 24 through 26, the unit 900 includes an uppermost part electrode 910a, a first via 912a, a second via 912b, a lowermost part electrode 910b, a first internal electrode 922, a second internal electrode 924a, a third internal electrode 924b, a fourth internal electrode 930, a line 940, a third via 950, and a fourth via 960.

The first via 912a, the line 940, and the second via 912b electrically connect the uppermost part electrode 910a to the lowermost part electrode 910b.

The total length of the first via 912a, line 940, and second via 912b is a length of substantially ½ the resonant wavelength. The first via 912a, line 940, and second via 912b function as a part of the λ/2 line to develop a negative dielectric constant. It is to be noted that the shape of the line 940 is not limited to the Meander line shown, and for example, a helical line and a spiral line may be employed.

The uppermost part electrode 910a and the lowermost part electrode 910b serve to increase the absolute value of a negative dielectric constant and shorten the resonant wavelength, as in the case of the conductive plate 412 shown in FIG. 14. However, it is also possible to omit the uppermost part electrode 910a and the lowermost part electrode 910b.

It is to be noted that an external end of the first via 912a (an end which is not connected to the line 940) and an external end of the second via 912b (an end which is not connected to the line 940) are preferably located outside the resonator for a negative magnetic permeability so that electric charges are accumulated on the both ends of the λ/2 line, with or without the uppermost part electrode 910a and the lowermost part electrode 910b.

The third via 950 electrically connects the second internal electrode 924a to the third internal electrode 930. The fourth via 960 electrically connects the third internal electrode 924b to the third internal electrode 930. The second internal electrode 924a, the third via 950, the third internal electrode 924b, the fourth via 960, and the third internal electrode 930 have the same structure as a split ring resonator, and function as a resonator for developing a negative magnetic permeability. The first internal electrode 922 serves to compensate for a capacitance in a discontinuous section between the second internal electrode 924a and the third internal electrode 924b and thus decrease the resonant frequency, as in the case of the first internal electrode 722 in the fourth embodiment.

The unit 900 according to the present embodiment requires no external electrode. Therefore, this unit is easily manufactured. In the case of the creation of a unit including an external electrode, typically, the section other than the external electrode is formed by stacking, and the external electrode is attached to the part formed by stacking. In contrast, the unit 900 according to the present embodiment can be created by only the formation by stacking.

In addition, the unit 900 is preferable for the creation of a metamaterial including multiple units arranged. When units including external electrodes are brought into contact with each other, an electric current flowing through the external electrode of one unit will also flow through the external electrode of the other unit, resulting in a failure to give rise to a proper resonance of electromagnetic waves. Therefore, it has been necessary to process the units, such as placing the units spaced apart from each other, or covering the external electrodes with an insulator. The units 900 according to the present embodiment can be placed adjacent to each other, and the metamaterial can be thus further reduced in size. In addition, since it is not necessary to process the units, it is easy to create a metamaterial with the use of the units 900.

Figure 27:
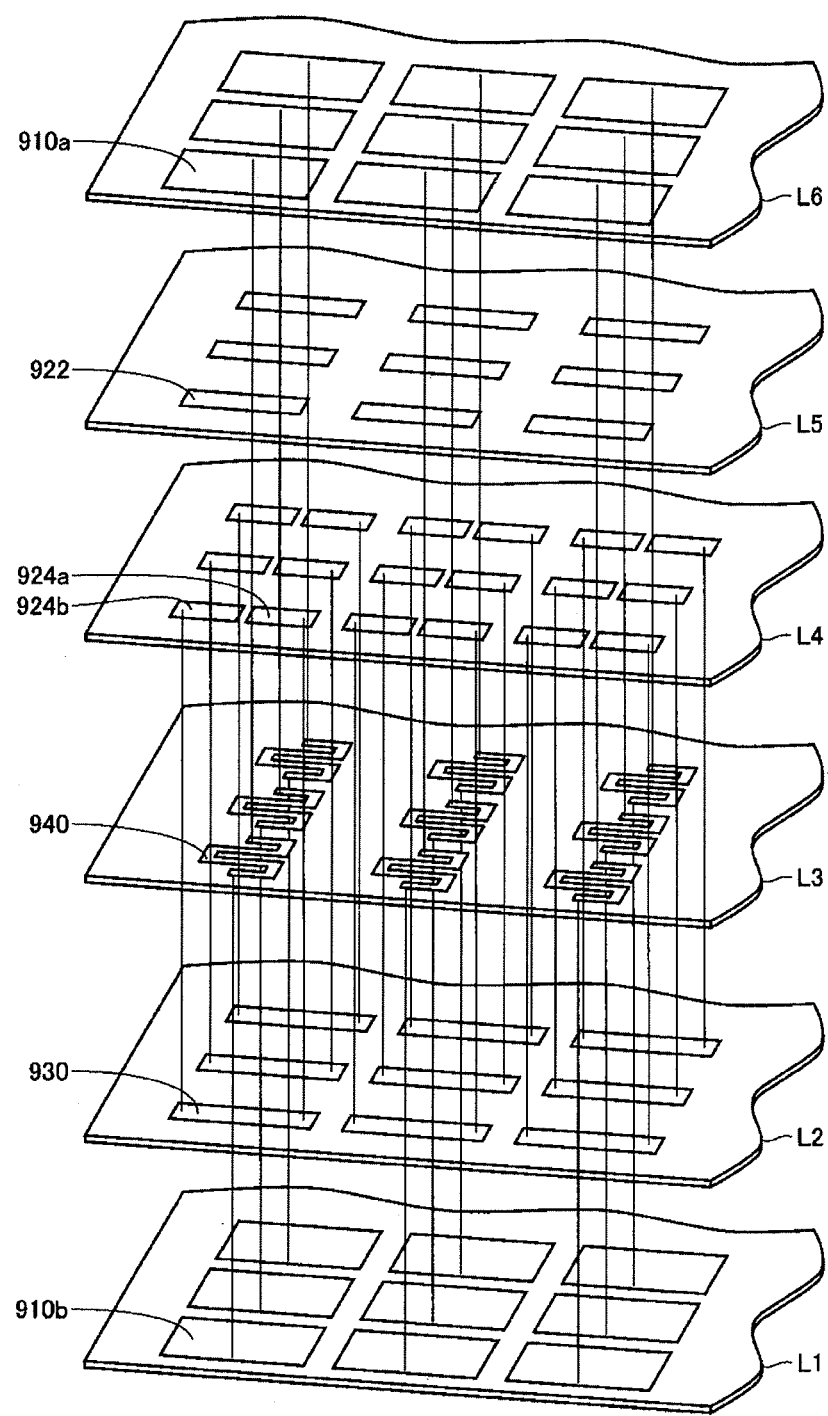
FIG. 27 is a diagram for explaining a method for creating the unit according to the sixth embodiment.

A method for creating the unit 900 will be described with reference to FIG. 27. FIG. 27 is a diagram for explaining a method for creating a unit 900 according to the sixth embodiment.

Referring to FIG. 27, the unit 900 is created by stacking multiple layers sequentially. FIG. 27 shows layers L1 to L6 including main components of the unit 900. The materials (substrate materials) of the respective layers are insulating materials such as resins. Metallic parts are formed on the substrate materials of some layers. In addition, the substrate materials of some layers have vias formed to penetrate through the substrate materials. It is to be noted that the layers L1 to L6 are partially shown in FIG. 27. Actually, the layers L1 to L6 further extend laterally in FIG. 27.

The layers L1 to L6 each have multiple (3×3 in FIG. 27) unit components periodically arranged. The layer L1 includes multiple lowermost part electrodes 910b. The layer L2 includes multiple fourth internal electrodes 930. The layer L3 includes multiple lines 940. The layer L4 includes multiple pairs of second internal electrodes 924a and third internal electrodes 924b. The layer L5 includes multiple first internal electrodes 922. The layer L6 includes multiple uppermost part electrodes 910a.

In addition, vias are formed in regions of the respective layers corresponding to the first via 912a, the second via 912b, the third via 950, and the fourth via 960. In FIG. 27, the vias are indicated by vertical thin lines.

After the respective layers are stacked to create a laminate, the laminate is cut to create units 900. The section shown in FIG. 27 can provide 9 units 900. It is to be noted that some units 900 may be collectively cut from the laminate, rather than separating the laminate into individual units 900.

It is to be noted that while the structure with the vias in place of the conductive sections of the split resonator described in the fourth embodiment has been described in the present embodiment, vias can be provided in place of conductive sections of the other types of resonators. For example, vias may be provided in place of the external electrodes of the multilayer capacitive resonator described in the third embodiment.

Seventh Embodiment

In the metamaterial units described above according to the third, fourth, and sixth embodiments, the line for developing a negative dielectric constant is formed in the LC resonator (specifically, the multilayer capacitive resonator and split resonator). However, the line may not be necessarily provided inside the LC resonator. In the seventh embodiment, a unit 1000 will be described in which a λ/2 line is placed outside an LC resonator.

Figure 28:
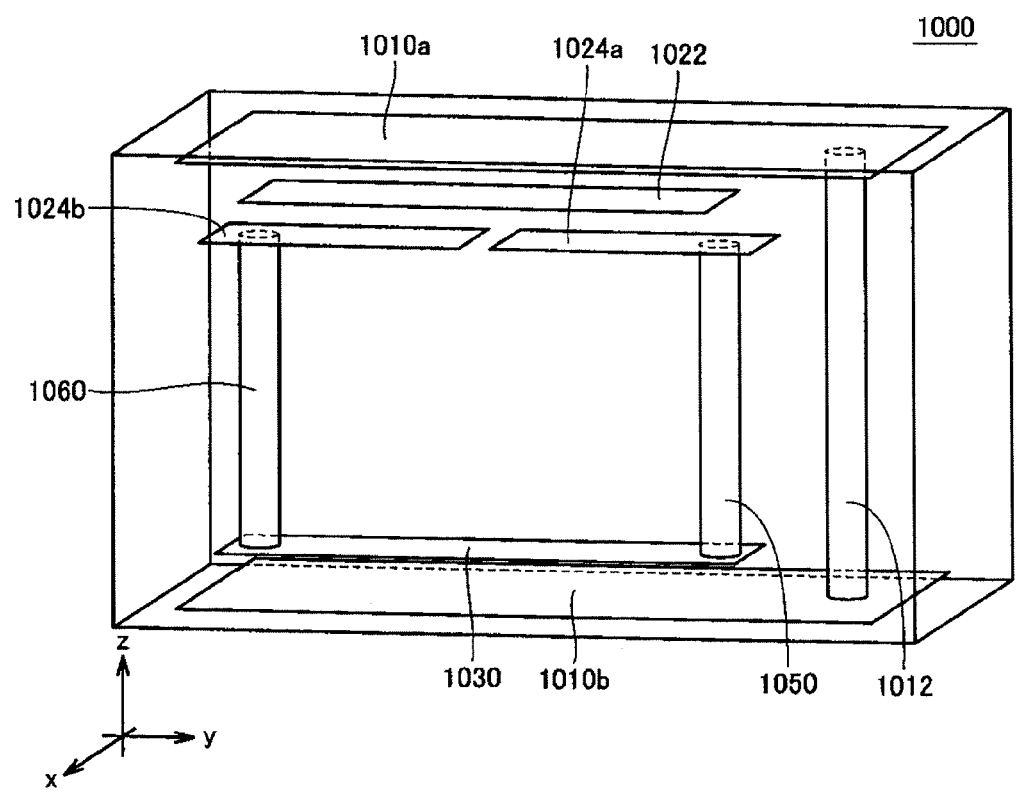
FIG. 28 is a diagram illustrating the structure of a unit according to a seventh embodiment.

The structure of a unit 1000 according to the seventh embodiment will be described with reference to FIG. 28. FIG. 28 is a diagram illustrating the structure of the unit 1000 according to the seventh embodiment.

Referring to FIG. 28, the unit 1000 includes an uppermost part electrode 1010a, a first via 1012, a lowermost part electrode 1010b, a first internal electrode 1022, a second internal electrode 1024a, a third internal electrode 1024b, a fourth internal electrode 1030, a second via 1050, and a third via 1060.

The first via 1012 electrically connects the uppermost part electrode 1010a to the lowermost part electrode 1010b. The length of the first via 1012 is substantially ½ of the resonant wavelength. Accordingly, the first via 1012 develops a negative dielectric constant with respect to electromagnetic waves of the resonant wavelength.

Further, in the present embodiment, the uppermost part electrode 1010a and the lowermost part electrode 1010b are connected by the linear first via 1012. However, as in the case of the structure shown in FIG. 25, multiple vias may be combined with a line in a horizontal plane to achieve a λ/2 line. For the reduction of the unit in size, the line in this case is preferably a bent line such as a Meander line, as described in the other embodiments.

The uppermost part electrode 1010a and the lowermost part electrode 1010b serve to increase the absolute value of a negative dielectric constant and shorten the resonant wavelength, as in the case of the uppermost part electrode 910a and lowermost part electrode 910b according to the sixth embodiment.

The second internal electrode 1024a, the first via 1050, the fourth internal electrode 1030, the second via 1060, and the third internal electrode 1024b have the same structure as a split ring resonator, and function as a resonator for developing a negative magnetic permeability. The first internal electrode 1022 serves to compensate for a capacitance in a discontinuous section between the second internal electrode 1024a and the third internal electrode 1024b and thus decrease the resonant frequency, as in the case of the first internal electrode 722 in the fourth embodiment.

The first internal electrode 1022, the second internal electrode 1024a, the first via 1050, the third internal electrode 1024b, the second via 1060, and the fourth internal electrode 1030 are placed in the space sandwiched between the uppermost part electrode 1010a and the lowermost part electrode 1010b. More specifically, in the case of the unit according to the present embodiment, a resonator for developing a negative magnetic permeability is formed in a resonator for developing a negative dielectric constant.

The unit 1000 according to the present embodiment has the internal electrodes electrically connected to each other through the vias as in the case of the unit 900 according to the fifth embodiment, and thus is easily created. In addition, the unit 1000 has no electrode at the surface of the unit, and thus is preferable for the creation of metamaterials.

Eighth Embodiment

In the metamaterial units according to the third to seventh embodiments, the electrodes for forming a capacitance are placed parallel to the xy plane in the LC resonators. In contrast, a metamaterial unit in which electrodes for forming a capacitance are placed parallel to the xz plane will be described in the eighth embodiment.

Figure 29:
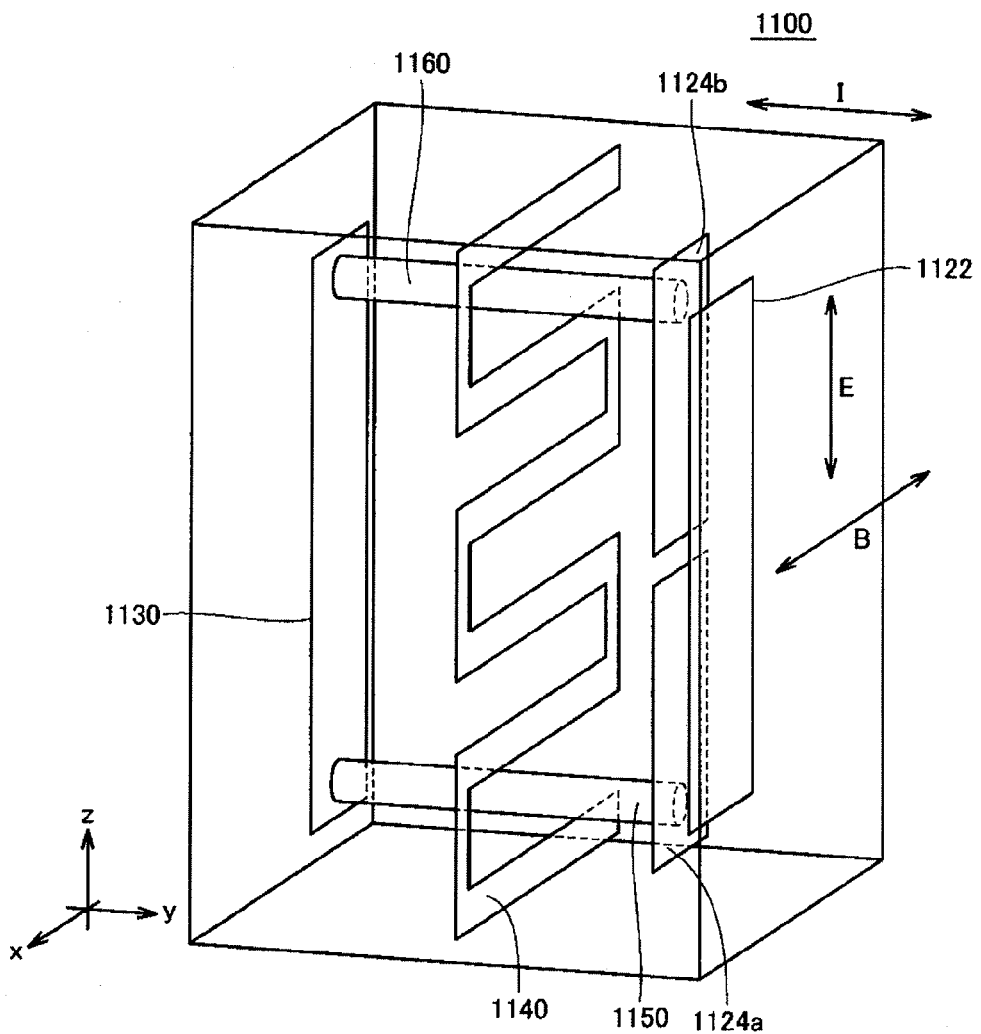
FIG. 29 is a diagram illustrating the structure of a unit according to a eighth embodiment.

The structure of a metamaterial unit 1100 according to the eighth embodiment will be described with reference to FIG. 29. FIG. 29 is a diagram illustrating the structure of the metamaterial unit 1100 according to the seventh embodiment. Reference symbols I, E, and B respectively denote a current flow direction, an electric field direction, and a magnetic field direction.

Referring to FIG. 29, the unit 1100 includes a first internal electrode 1122, a second internal electrode 1124a, a third internal electrode 1124b, a fourth internal electrode 1130, a line 1140, a first via 1150, and a third via 1160.

The line 1140 is a Meander line which has a total length of substantially ½ the resonant wavelength. Therefore, the line 1140 develops a negative dielectric constant with respect to electromagnetic waves of the resonant wavelength. It is to be noted that the shape of the line 1140 is not limited to the shape shown in FIG. 29. For example, a helical line may be used instead of the line 1140. In addition, the line 1140 may be linear, depending on the required resonant wavelength or the size of the metamaterial.

The first internal electrode 1122, the second internal electrode 1124a, the first via 1150, the third internal electrode 1124b, the second via 1160, and the fourth internal electrode 1130 form an LC resonance loop as in the case of the resonators for a negative magnetic permeability according to the other embodiments.

However, unlike the other embodiments, the electrodes (1122, 1124a, 1124b, and 1130) are all placed parallel to the xz plane. This is because the generated electric field reduces the effect on the LC resonance. In the electrode arrangement shown in FIG. 29, the electric field generated from the signal line and the electric field generated from the $\lambda/2$ line during the resonance of the dielectric constant both have a small effect on the LC resonance.

In contrast, for example, in the case of the unit 900 shown in FIG. 25, the resonance of the dielectric constant generates an electric field between the first outermost electrode 910a and the second outermost electrode 910b. This electric field produces a difference in electric potential between the first internal electrode 922 and the second internal electrode 924a (or the third internal electrode 924b) to affect the LC resonance. The electrode arrangement as in the case of the unit 1100 according to the present embodiment makes it easier to develop the resonance of the dielectric constant and the resonance of the magnetic permeability at the same time.

In addition, the LC resonance loop is placed in a region sandwiched between the both ends of the line 1140 in the present embodiment. More specifically, one end of the line 1140 is located on the signal line side (+z side) more than the loop, whereas the other end of the line 1140 is located on the ground side (−z side) more than the loop. These locations are achieved for preventing an electric field concentrated around the both ends of the line 1140 and a magnetic field concentrated in the loop due to the LC resonance from interfering with each other when the line 1140 gives rise to an antiresonance with respect to electromagnetic waves.

It is to be noted that no electrode plate is connected to either end of the line 1140 in the present embodiment. This configuration reduces the absolute value of a negative dielectric constant and requires a length close to $\lambda/2$, as compared with a case of connecting an electrode plate. The arrangement of the electrode plates according to the present embodiment is particularly effective in the case of connecting no electrode plate to the line as described above. This is because, in the presence of any electrode plate, the electrode plate makes the LC resonator less likely to be affected by the electric filed generated by the signal line, whereas in the absence of any electrode plate, the LC resonator is affected greatly by the electric filed generated by the signal line.

The unit 1100 according to the present embodiment has the internal electrodes connected by the vias, as in the case of the unit 900, etc., and can be thus created easily. It is to be noted that the unit 1100 is created most easily by stacking multiple layers parallel to the xz plane in FIG. 29.

[Others]

The range in application of the present invention is not limited to the above embodiments. For example, hollow structure (including an internal space) configured with the use of a wire or the like may be used for at least either one of units with a negative dielectric constant and a negative magnetic permeability to constitute the both units in the same volume area at the same time, and thereby provide a substantially continuous periodic arrangement of respective units for a negative dielectric constant and a negative magnetic permeability, which can be considered as one mode of the present invention. In addition, units with a negative dielectric constant and a negative magnetic permeability may be built in a multilayer structure at the same time to provide a substantially continuous periodic arrangement of respective units for a negative dielectric constant and a negative magnetic permeability, which can be considered as one mode of the present invention.

It is to be noted that the unit "including an internal space" refers to not only the absence of anything (the presence of air) in the unit, as is clear from the respective embodiments described above, but also the absence of any metallic member such as an electrode in the unit, into which other metallic member can be put. Even when a dielectric body such as a resin is present in a section of the unit other than the metallic member, the unit can be said to "include an internal space".

In addition, the arrangement of a plurality of metamaterial units is supposed to be used as a metamaterial in the above embodiments. The arrangement of a plurality of metamaterial units allows the electrical characteristics of the metamaterial to be developed over a wide range. This metamaterial can be utilized for an electromagnetic field filter, or the like.

However, the individual metamaterial units in the present embodiments described above can be also considered as one mode of the metamaterial according to the present invention. For example, the placement of these metamaterials near a plurality of parallel lines allows the metamaterials to function as couplers for electrically coupling the lines.

The embodiments disclosed herein are to be considered exemplary in all respects, but not to be considered restrictive. The scope of the present invention is defined by the claims, not by the description above, and intended to encompass all modifications within the spirit and scope equivalent to the claims.

DESCRIPTION OF REFERENCE SYMBOLS 2 first external electrode
3 second external electrode
4 first internal electrode
5 second internal electrode
6 spacer
10 outer covering
100, 100a, 100b coiled resonator
110 central axis
200 signal line
220 ground
300 capacitive resonator
410 coiled resonator
412 conductive plate
420 coiled resonator
510 split ring
520 metallic plate
600 unit
610a uppermost part electrode
610b lowermost part electrode
622 first internal electrode
624 second internal electrode
632 third internal electrode
634 fourth internal electrode 640 line
650 first external electrode
660 second external electrode
700 unit
710a uppermost part electrode
710b lowermost part electrode
722 first internal electrode
724a second internal electrode
724b third internal electrode
730 fourth internal electrode
740 line
750 first external electrode
760 second external electrode
800 unit
810 coiled conductor
822 first electrode
824 second electrode
832 third electrode
834 fourth electrode
842 first via
844 second via
900 unit
910a uppermost part electrode
912a first via
912b second via
910b lowermost part electrode
922 first internal electrode
924a second internal electrode
924b third internal electrode
930 fourth internal electrode
940 line
950 third via
960 fourth via
1000 unit
1010a uppermost part electrode
1010b lowermost part electrode
1012 first via
1022 first internal electrode
1024a second internal electrode
1024b third internal electrode
1030 fourth internal electrode
1050 second via
1060 third via

The invention claimed is:

1. A metamaterial comprising:
a plurality of first resonators that each generate a negative dielectric constant with respect to a predetermined wavelength, each of the first resonators defining an internal space;
a plurality of second resonators that each generate a negative magnetic permeability with respect to the predetermined wavelength and wherein the second resonators are multilayer capacitive resonators; and
a supporting member that fixes each of the second resonators inside the plurality of first resonators, and fixes the plurality of first resonators so that the plurality of first resonators are disposed in a spatially continuous manner,
wherein a length of the plurality of second resonators along a direction of electric current propagation in a signal line is less than $\lambda/20$ with respect to a wavelength $\lambda$ of an electromagnetic wave at a resonant frequency, and
wherein the multilayer capacitive resonators have a capacitance and an inductance, and the capacitance and the inductance comprise a closed-loop.

2. The metamaterial according to claim 1, wherein each of the first resonators comprise a metallic wire having a length of substantially half the predetermined wavelength.

3. The metamaterial according to claim 2, wherein the metallic wire comprises a first coil having a length of substantially half the predetermined wavelength and a central axis,
each of the second resonators includes a second coil and a center axis orthogonal to the central axis of the first coil, and
the supporting member fixes the first coil and the second coil so that the first coil and the second coil are disposed so as to be alternately linked.

4. The metamaterial according to claim 2, wherein the metallic wire comprises a first coil having a length of substantially half the predetermined wavelength and a central axis, and the supporting member fixes each of the second resonators in a region surrounded by a corresponding first coil.

5. The metamaterial according to claim 4, wherein each of the second resonators includes a second coil and a center axis orthogonal to the central axis of the first coil.

6. The metamaterial according to claim 5, wherein each of the first resonators further comprises a conductive plate connected to an end of the first coil.

7. The metamaterial according to claim 2, wherein each of the first resonators further comprises:
a first plate electrode connected to a first end of the metallic wire, and
a second plate electrode connected to a second end of the metallic wire, the second end being opposite to the first end,
wherein the supporting member fixes each of the second resonators in a region between the first plate electrode and the second plate electrode.

8. The metamaterial according to claim 7, wherein the metallic wire is bent.

9. The metamaterial according to claim 7, wherein each of the second resonators comprises:
a first electrode plane,
a second electrode plane opposed to the first electrode plane, and
a conductive section that electrically connects the first electrode plane and the second electrode plane.

10. The metamaterial according to claim 9, wherein the supporting member comprises an insulating material, the first electrode plane and the second electrode plane are in the insulating material, and the conductive section electrically connects the first electrode plane and the second electrode plane through a via in the insulating material.

11. The metamaterial according to claim 10, wherein the supporting member, the first resonators, and the second resonators are multiple substrate layers.

12. A metamaterial comprising:
a first resonator that generates a negative dielectric constant with respect to a predetermined wavelength, the first resonator defining an internal space;
a second resonator that generates a negative magnetic permeability with respect to the predetermined wavelength, wherein the second resonator is a multilayer capacitive resonator; and
a supporting member that fixes positions of the first resonator and the second resonator so that the second resonator is inside the first resonator,
wherein a length of the second resonator along a direction of electric current propagation in a signal line is less than λ/20 with respect to a wavelength λ of an electromagnetic wave at a resonant frequency, and wherein the multilayer capacitive resonator has a capacitance and an inductance, and the capacitance and the inductance comprise a closed-loop.

13. A metamaterial comprising:
a plurality of first resonators that each generate a negative dielectric constant with respect to a predetermined wavelength;
a plurality of second resonators that each generate a negative magnetic permeability with respect to the predetermined wavelength, each of the second resonators defining an internal space, and wherein the second resonators are multilayer capacitive resonators; and
a supporting member that fixes positions of the first resonator and the second resonator so that each of the first resonators is inside the plurality of second resonators, and fixes the plurality of second resonators so that the plurality of second resonators are disposed in a spatially continuous manner,
wherein a length of the plurality of second resonators along a direction of electric current propagation in a signal line is less than λ/20 with respect to a wavelength λ of an electromagnetic wave at a resonant frequency, and
wherein the multilayer capacitive resonators have a capacitance and an inductance, and the capacitance and the inductance comprise a closed-loop.

14. The metamaterial according to claim 13, wherein each of the first resonators comprises a metallic wire having a length of substantially half the predetermined wavelength.

15. The metamaterial according to claim 13, wherein the metallic wire is bent.

16. The metamaterial according to claim 13, wherein each of the second resonators comprises:
a first electrode plane,
a second electrode plane opposed to the first electrode plane, and
a conductive section that electrically connects the first electrode plane and the second electrode plane.

17. The metamaterial according to claim 16, wherein the supporting member comprises an insulating material, the first electrode plane and the second electrode plane are in the insulating material, and the conductive section electrically connects the first electrode plane and the second electrode plane through a via in the insulating material.

18. The metamaterial according to claim 17, wherein the supporting member, the first resonators, and the second resonators are multiple substrate layers.

19. A metamaterial comprising:
a first resonator that generates a negative dielectric constant with respect to a predetermined wavelength;
a second resonator that generates a negative magnetic permeability with respect to the predetermined wavelength, the second resonator defining an internal space, and wherein the second resonator is a multilayer capacitive resonator; and
a supporting member that fixes positions of the first resonator and the second resonator so that the first resonator is inside the second resonator,
wherein a length of the second resonator along a direction of electric current propagation in a signal line is less than λ/20 with respect to a wavelength λ of an electromagnetic wave at a resonant frequency, and
wherein the multilayer capacitive resonator has a capacitance and an inductance, and the capacitance and the inductance comprise a closed-loop.

* * * * *